(12) United States Patent
Otani et al.

(10) Patent No.: US 10,045,431 B2
(45) Date of Patent: Aug. 7, 2018

(54) ENDOSCOPE SYSTEM AND METHOD OF OPERATING ENDOSCOPE SYSTEM

(71) Applicant: FUJIFILM Corporation, Tokyo (JP)

(72) Inventors: Kenichi Otani, Ashigarakami-gun (JP); Makoto Sugizaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 255 days.

(21) Appl. No.: 15/196,724

(22) Filed: Jun. 29, 2016

(65) Prior Publication Data

US 2017/0006202 A1 Jan. 5, 2017

(30) Foreign Application Priority Data

Jun. 30, 2015 (JP) ................................. 2015-131741

(51) Int. Cl.
*H04N 5/225* (2006.01)
*H05B 41/38* (2006.01)
(Continued)

(52) U.S. Cl.
CPC ........... *H05B 41/38* (2013.01); *H04N 5/2354* (2013.01); *H04N 5/23209* (2013.01); *H04N 9/045* (2013.01); *H04N 2005/2255* (2013.01)

(58) Field of Classification Search
CPC .. H05B 41/38; H04N 5/23209; H04N 5/2354; H04N 9/045
(Continued)

(56) References Cited

U.S. PATENT DOCUMENTS 6,118,521 A * 9/2000 Jung .................... A61B 5/0088
250/227.14
2004/0263645 A1 12/2004 Okada et al.
(Continued)

FOREIGN PATENT DOCUMENTS

JP 11-225953 A 8/1999
JP 2000-115790 A 4/2000
(Continued)

OTHER PUBLICATIONS

Japanese Notification of Reasons for Refusal for corresponding Japanese Application No. 2015-131741, dated Apr. 27, 2018, with Machine translation.

*Primary Examiner* — Hee-Yong Kim
(74) *Attorney, Agent, or Firm* — Birch, Stewart, Kolasch & Birch, LLP

(57) ABSTRACT

An endoscope system includes a color image sensor, having pixels sensitive to plural colors different from one another, for imaging an object. Plural LEDs discretely generate light of colors different from one another, to apply polychromatic light constituted by spectrally combining the light of the colors to the object. A light source controller controls the plural LEDs, to correct an intensity ratio of an integrated emission intensity between the plural colors according to receiving the first polychromatic light with respectively the pixels of the plural colors, so that the intensity ratio becomes equal to a target ratio of an integrated emission intensity between the plural colors according to receiving continuous spectrum light with respectively the pixels of the plural colors, the continuous spectrum light having an at least partial wavelength range of light emitted by a white light source.

20 Claims, 19 Drawing Sheets

(51) Int. Cl.
   *H04N 5/378*   (2011.01)
   *H04N 5/232*   (2006.01)
   *H04N 5/235*   (2006.01)
   *H04N 9/04*    (2006.01)

(58) Field of Classification Search
   USPC .......................................................... 348/70
   See application file for complete search history.

(56) References Cited

U.S. PATENT DOCUMENTS

2009/0156901  A1      6/2009   Gono
   2012/0026339  A1      2/2012   Kojima et al.
   2015/0092035  A1      4/2015   Yamamoto et al.
   2016/0037999  A1      2/2016   Yabe et al.
   2016/0266054  A1*     9/2016   Cao ..................... A61B 6/4241

FOREIGN PATENT DOCUMENTS

JP           2001-201697  A      7/2001
   JP           2012-29728   A      2/2012
   JP           2012-55391   A      3/2012
   JP           2012-143397  A      8/2012
   JP           2013-202166  A     10/2013
   JP           2013-255655  A     10/2013
   WO    WO 2007/039981  A1      4/2007
   WO    WO 2015/005277  A1      1/2015

* cited by examiner

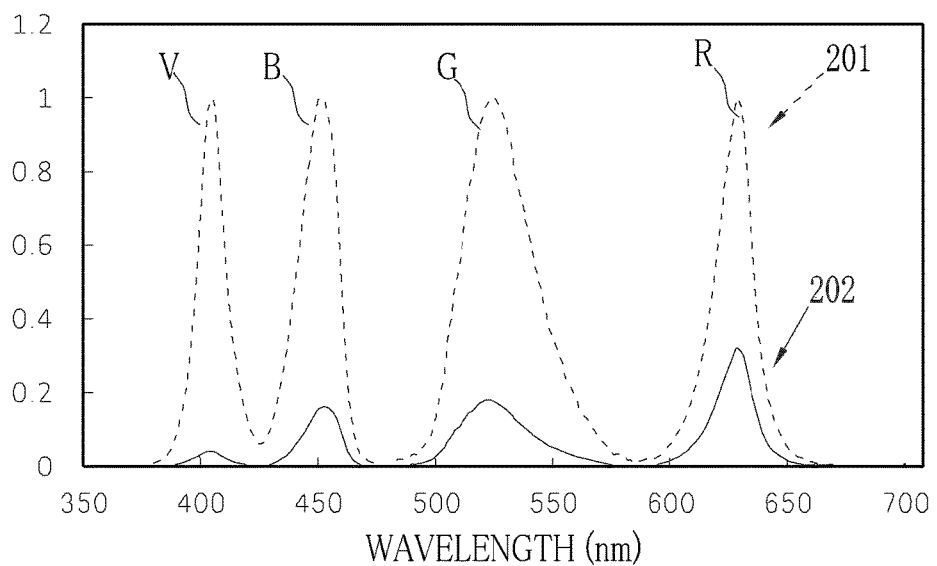
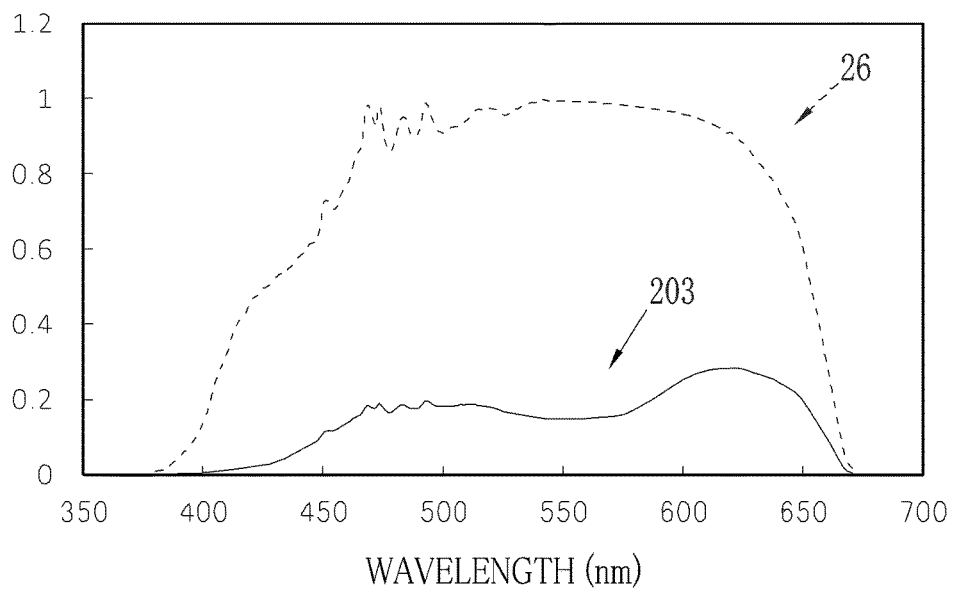

ENDOSCOPE SYSTEM AND METHOD OF OPERATING ENDOSCOPE SYSTEM

CROSS-REFERENCE TO RELATED APPLICATION

This application claims priority under 35 USC 119 from Japanese Patent Application No. 2015-131741, filed 30 Jun. 2015, the disclosure of which is incorporated by reference herein.

BACKGROUND OF THE INVENTION

1. Field of the Invention

The present invention relates to an endoscope system and method of operating the endoscope system. More particularly, the present invention relates to an endoscope system and method of operating the endoscope system, in which light sources of plural colors are combined for illuminating an object in a body cavity, and an endoscopic image of the object can be formed with acceptable image hue even with light of the light sources without use of continuous spectrum light from a broadband light source.

2. Description Related to the Prior Art

An endoscope system is well-known in the field of medical diagnosis, and includes a light source apparatus, an endoscope and a processing apparatus. The light source apparatus generates light for illuminating an object of interest in a body cavity, for example, mucosa or tissue. A xenon lamp for generating continuous spectrum light or broadband light has been widely used in the light source apparatus as a light source. However, use of semiconductor light sources, such as LEDs (light emitting diodes), has been developed instead of the xenon lamp as a broadband light source. For example, blue, green and red LEDs and the like are combined for emitting light of different colors in the light source, so that polychromatic light or multi color spectrum light is generated for illumination with an emission spectrum of the combination of light components of those colors.

U.S. Pat. Pub. No. 2015/092,035 (corresponding to JP-A 2013-255655) discloses the endoscope system in which the light source apparatus includes four semiconductor light sources controllable discretely. The emission spectrum (intensity distribution for respective wavelengths) of light is adjusted by controlling intensities of the semiconductor light sources, so that an object of interest is illuminated with light optimized in consideration of a characteristic of an image to be formed. Examples of the characteristics of the image are an image with a high dynamic range in relation to brightness, an image having a low color temperature, an image having a high color temperature, an image of an object with a small area illuminated with special narrow band light of a narrow wavelength range for special use, and the like. The emission spectrum is adjusted according to the respective characteristics.

Also, JP-A 2013-202166 discloses the semiconductor light sources controllable discretely from one another, in combination with a detector for detecting an endoscope type of the endoscope. A driving condition for the semiconductor light sources is determined by considering the endoscope type. A light guide device for transmitting light for illumination has a transmission characteristic with a difference between a plurality of endoscope types. Thus, an intensity ratio between intensities of the semiconductor light sources is determined according to the transmission characteristic of the light guide device by recognizing the endoscope type.

For illumination in the endoscope system, the use of the polychromatic light from a plurality of semiconductor light sources has been spread recently in the field of endoscopy rather than the use of the continuous spectrum light from the xenon lamp utilized conventionally. However, there is a difference in the emission spectrum between the continuous spectrum light and the polychromatic light. Even after imaging of the same object of interest, there occurs a difference in image hue (visual form) of the object of interest between an image after lighting with the continuous spectrum light and an image after lighting with the polychromatic light. Both of the continuous spectrum light and the polychromatic light are available for use in lighting with respective advantages in spite of the difference in the image hue of the object of interest. However, the use of the polychromatic light for imaging is particularly advantageous, because the semiconductor light sources are controllable discretely to adjust the emission spectrum appropriately for a type, condition or the like of the object of interest.

In the field of the endoscope system, a history of using the continuous spectrum light the xenon lamp and the like for illumination is long considerably. Most of doctors or operators of endoscopy are accustomed to the image hue of the object of interest illuminated with the continuous spectrum light of the xenon lamp. It is preferable to image the object of interest in the same manner as with illumination of the continuous spectrum light of the xenon lamp widely used even in the use of the polychromatic light of a plurality of the semiconductor light sources for illumination. Furthermore, numerous archived endoscopic images for medical database have been originally recorded by use of the continuous spectrum light of the xenon lamp. It is preferable newly to image the object of interest in the same manner as with illumination of the continuous spectrum light of the xenon lamp widely used even in the use of the polychromatic light of a plurality of the semiconductor light sources, because of facilitating comparison between cases and making decision of diagnosis.

In view of this situation, color rendering of the emission spectrum of the continuous spectrum light by use of the semiconductor light sources has been attempted technically in the field of endoscopy. However, it is extremely difficult to output light of the emission spectrum of the continuous spectrum light by use of the semiconductor light sources reliably in a complete manner. For example, a blue LED (light emitting diode) and a green LED are used as light sources. The blue and green LEDs have such a characteristic that an intensity decreases from a center wavelength of the wavelength range toward wavelengths different from the center wavelength. The intensity of an intermediate color with a wavelength between blue and green is difficult to adjust only by adjusting the intensity of the blue and green LEDs. Assuming that the intensity of the center wavelength of each of the blue and green LEDs is set near to the intensity of the continuous spectrum light, the intensity of the intermediate color between blue and green becomes considerably smaller than the intensity of the continuous spectrum light. Assuming that the intensity of each of the blue and green LEDs is increased to set the intensity of the intermediate color between blue and green near to the intensity of the continuous spectrum light, the intensity of the center wavelength of each of the blue and green LEDs may become extremely larger than the intensity of the continuous spectrum light.

SUMMARY OF THE INVENTION

In view of the foregoing problems, an object of the present invention is to provide an endoscope system and method of operating the endoscope system, in which light sources of plural colors are combined for illuminating an object in a body cavity, and an endoscopic image of the object can be formed with acceptable image hue even with light of the light sources without use of continuous spectrum light from a broadband light source.

In order to achieve the above and other objects and advantages of this invention, an endoscope system includes a light source apparatus having plural light sources for discretely emitting light of colors different from one another, for generating first polychromatic light having a first polychromatic spectrum by combining light from the plural light sources. An image sensor has pixels of plural colors sensitive to colors different from one another. A light source controller controls the plural light sources, to cause an intensity ratio of an integrated emission intensity between the plural colors according to receiving the first polychromatic light with respectively the pixels of the plural colors to become equal to a ratio of an integrated emission intensity between the plural colors according to receiving continuous spectrum light with respectively the pixels of the plural colors, the continuous spectrum light having an at least partial wavelength range of light emitted by a white light source.

Preferably, the continuous spectrum light is white light.

Preferably, the white light is emitted by a xenon lamp.

Preferably, the image sensor includes first color pixels sensitive to a first color, second color pixels sensitive to a second color, and third color pixels sensitive to a third color. The light source controller causes a ratio between an integrated emission intensity of the first color obtained with the first color pixels and an integrated emission intensity of the second color obtained with the second color pixels to be equal between use of the first polychromatic light and use of the continuous spectrum light. The light source controller causes a ratio between an integrated emission intensity of the third color obtained with the third color pixels and the integrated emission intensity of the second color to be equal between the use of the first polychromatic light and the use of the continuous spectrum light.

Preferably, the image sensor further includes fourth color pixels sensitive to a fourth color. The light source controller causes the ratio between the integrated emission intensity of the first color obtained with the first color pixels and the integrated emission intensity of the second color obtained with the second color pixels to be equal between the use of the first polychromatic light and the use of the continuous spectrum light. The light source controller causes the ratio between the integrated emission intensity of the third color obtained with the third color pixels and the integrated emission intensity of the second color to be equal between the use of the first polychromatic light and the use of the continuous spectrum light. The light source controller causes a ratio between an integrated emission intensity of the fourth color obtained with the fourth color pixels and the integrated emission intensity of the second color to be equal between the use of the first polychromatic light and the use of the continuous spectrum light.

Preferably, the light source controller controls a light intensity ratio between the plural light sources.

Preferably, the light source controller causes an intensity ratio of an integrated emission intensity between the plural colors according to receiving returned light of the first polychromatic light applied to an object with respectively the pixels of the plural colors to become equal to a ratio of an integrated emission intensity between the plural colors according to receiving returned light of the continuous spectrum light applied to the object with respectively the pixels of the plural colors.

Preferably, furthermore, a ratio memory stores the light intensity ratio for each of types of an object to be imaged. The light source controller selects the light intensity ratio to be used in association with one of the types of the object.

Preferably, the image sensor is a color image sensor of a complementary color type having color filters of cyan, magenta and yellow.

Preferably, the light source controller further causes a total of the integrated emission intensity for respective the colors according to receiving the first polychromatic light with the pixels of the plural colors to be equal to a total of the integrated emission intensity for respective the colors according to receiving the continuous spectrum light with the pixels of the plural colors for respective wavelength ranges.

In another preferred embodiment, the image sensor is a color image sensor of a primary color type having color filters of blue, green and red.

Preferably, assuming that a number of the colors of the light sources is larger than a number of the colors of the pixels, and that one of the pixels receives light of a wavelength range generated by the light sources of the plural colors in the first polychromatic light, then the integrated emission intensity is set equal to an integrated emission intensity obtained by receiving the continuous spectrum light for each of the wavelength range of the light received by the one pixel.

Preferably, the light source apparatus with the plural light sources generates second polychromatic light having a second polychromatic spectrum different spectrally from the first polychromatic light and the continuous spectrum light. The light source controller causes an integrated emission intensity according to receiving the second polychromatic light with blue color pixels having a blue color filter to be larger than an integrated emission intensity according to receiving the first polychromatic light with the blue color pixels.

Preferably, furthermore, an intensity detection unit detects light intensities of respectively the plural light sources. The light source controller operates by use of a result output by the intensity detection unit, considers a light intensity of a lowest level light source of which a shortage of the light intensity is greatest with reference to a target light intensity of the light intensity for the first polychromatic light, and sets light intensities of remaining light sources among the light sources.

Preferably, the intensity detection unit detects the light intensities of the plural light sources repeatedly while the plural light sources emit the light.

Preferably, furthermore, a monitoring device checks whether the ratio of the integrated emission intensity between the colors obtained by receiving the first polychromatic light with the pixels of the plural colors is equal to the ratio of the integrated emission intensity between the colors obtained by receiving the continuous spectrum light with the pixels of the plural colors.

Preferably, furthermore, an intensity detection unit detects light intensities of respectively the plural light sources. The monitoring device operates by use of a result output by the intensity detection unit, and checks whether the intensity ratio of the integrated emission intensity between the plural colors according to receiving the first polychromatic light with respectively the pixels of the plural colors is equal to the ratio of the integrated emission intensity between the plural colors according to receiving the continuous spectrum light with respectively the pixels of the plural colors.

In still another preferred embodiment, the monitoring device operates by use of an output of the image sensor, and checks whether the intensity ratio of the integrated emission intensity between the plural colors according to receiving the first polychromatic light with respectively the pixels of the plural colors is equal to the ratio of the integrated emission intensity between the plural colors according to receiving the continuous spectrum light with respectively the pixels of the plural colors.

Preferably, the light source controller controls the plural light sources according to a result of checking in the monitoring device.

Also, a method of operating an endoscope system is provided, the endoscope system including a light source apparatus having plural light sources for discretely emitting light of colors different from one another, for generating first polychromatic light having a first polychromatic spectrum by combining light from the plural light sources, and an image sensor having pixels of plural colors sensitive to colors different from one another. The method includes a step of controlling the plural light sources with a light source controller, to cause an intensity ratio of an integrated emission intensity between the plural colors according to receiving the first polychromatic light with respectively the pixels of the plural colors to become equal to a ratio of an integrated emission intensity between the plural colors according to receiving continuous spectrum light with respectively the pixels of the plural colors, the continuous spectrum light having an at least partial wavelength range of light emitted by a white light source.

Consequently, an endoscopic image of the object can be formed with acceptable image hue even with light of the light sources without use of continuous spectrum light from a broadband light source, because an intensity ratio between the colors of the light sources is set equal to the target ratio so as to provide improved whiteness in the colors of the combined light.

BRIEF DESCRIPTION OF THE DRAWINGS

The above objects and advantages of the present invention will become more apparent from the following detailed description when read in connection with the accompanying drawings, in which:

FIG. 9 is a graph illustrating image light according to the violet, blue, green and red light;

FIG. 10 is a graph illustrating image light according to the continuous spectrum light;

DETAILED DESCRIPTION OF THE PREFERRED EMBODIMENT(S) OF THE PRESENT INVENTION

First Embodiment

Figure 1:
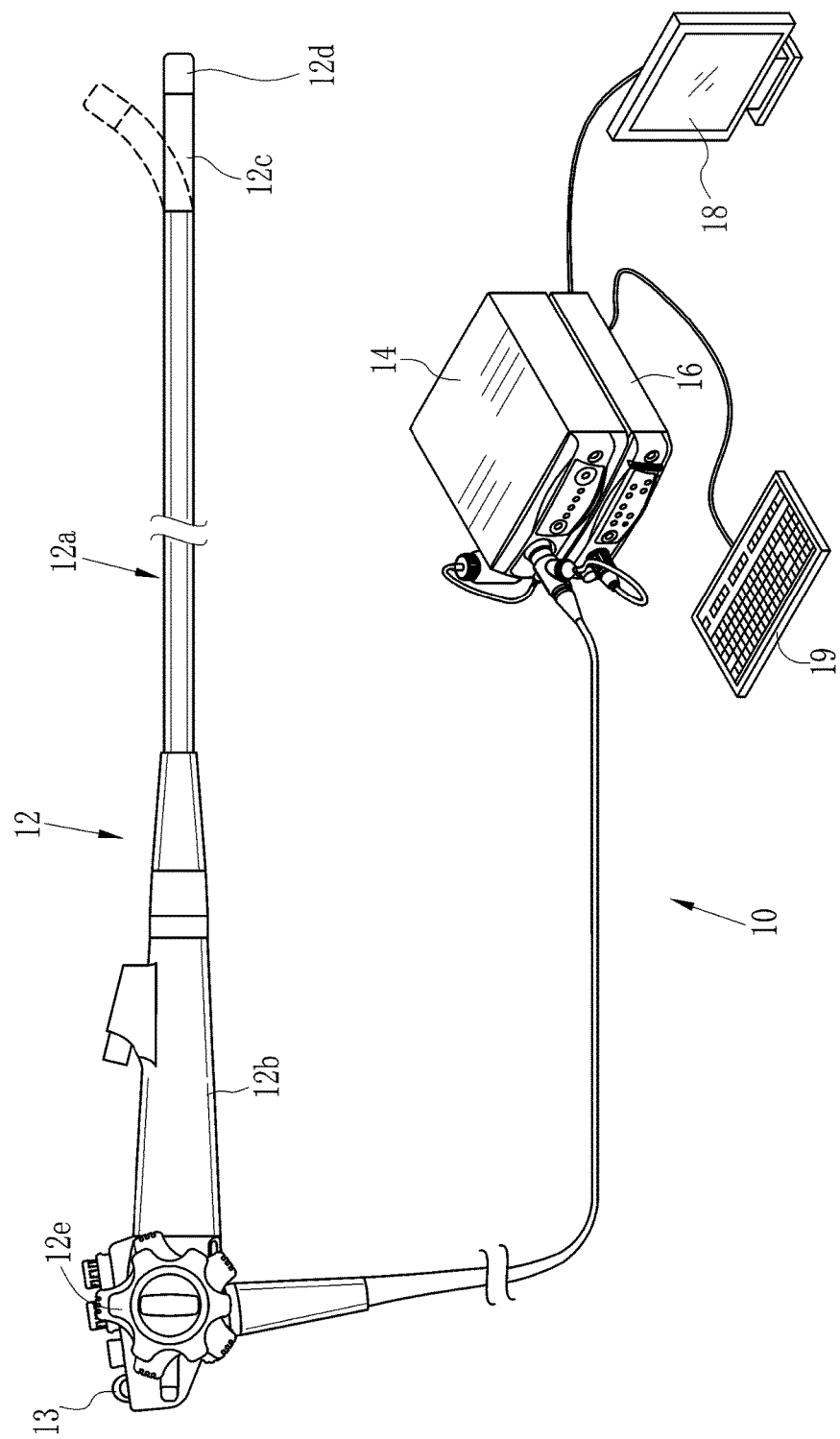
FIG. 1 is an explanatory view illustrating an endoscope system.

In FIG. 1, an endoscope system 10 includes an endoscope 12, alight source apparatus 14, a processing apparatus 16, a monitor display panel 18 and an input interface 19 or system terminal (console). The endoscope 12 is optically coupled with the light source apparatus 14, and also electrically connected to the processing apparatus 16. The endoscope 12 includes an elongated tube 12a, a grip handle 12b, a steering device 12c and an endoscope tip 12d. The elongated tube 12a is entered in a body cavity of a patient's body, for example, gastrointestinal tract. The grip handle 12b is disposed at a proximal end of the elongated tube 12a. The steering device 12c and the endoscope tip 12d are arranged on a distal side of the elongated tube 12a. Steering wheels 12e (knobs) are disposed on the grip handle 12b, and manually rotated to steer the steering device 12c. Thus, the endoscope tip 12d is directed in a desired direction. A zoom switch 13 is disposed on the grip handle 12b in addition to the steering wheels 12e.

The processing apparatus 16 is electrically connected to the monitor display panel 18 and the input interface 19. The monitor display panel 18 displays an image in each of plural imaging modes, and meta information associated with the image. The input interface 19 is a terminal device with a user interface for receiving input operation, for example, inputs for function setting. Also, a storage medium (not shown) can be connected to the processing apparatus 16 for storing the image, meta information and the like.

Figure 2:
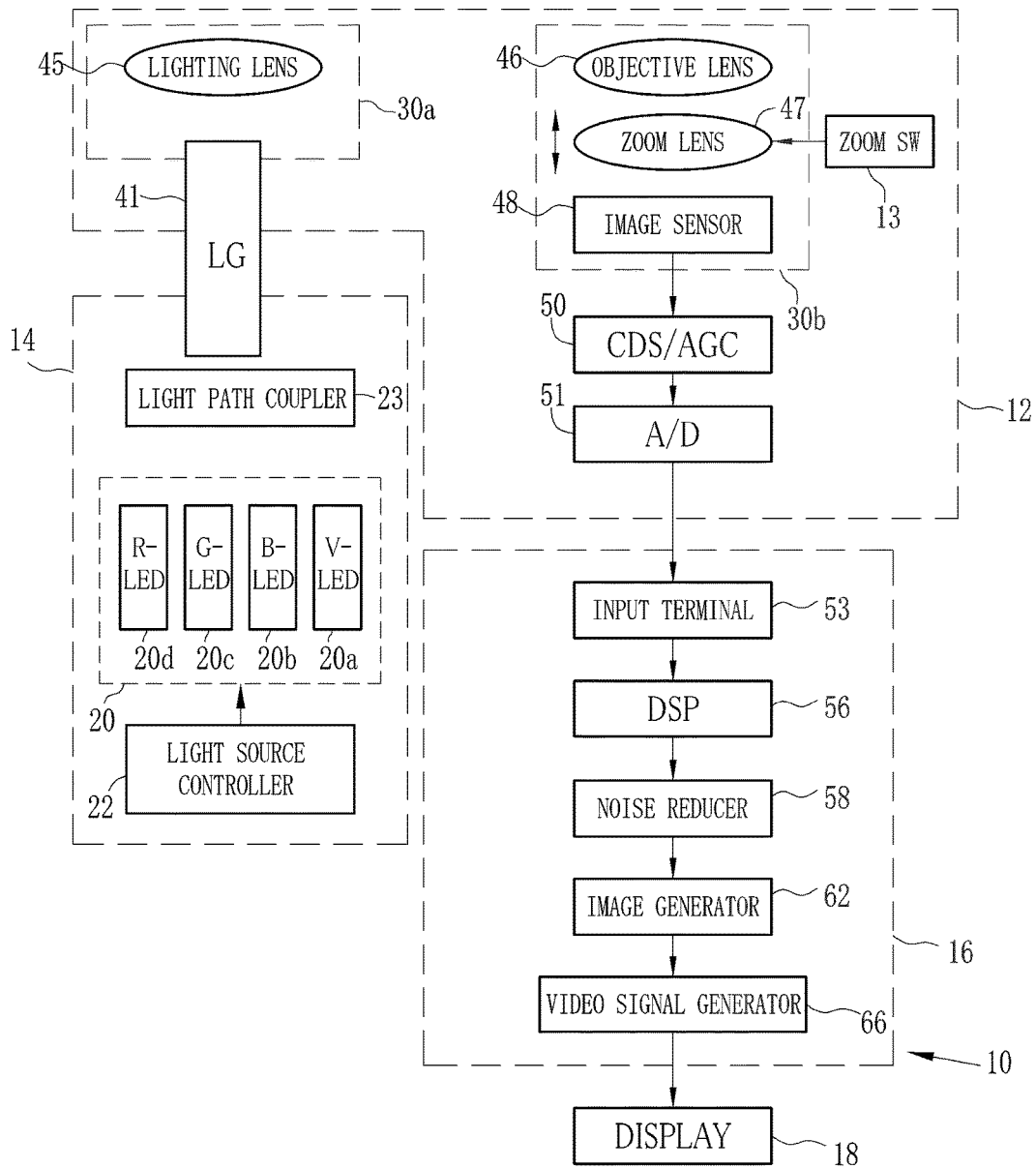
FIG. 2 is a block diagram schematically illustrating circuit devices in the endoscope system.

In FIG. 2, the light source apparatus 14 generates light for illuminating an object of interest, and includes a light source unit 20, a light source controller 22 and a light path coupler 23. The light source unit 20 includes a plurality of light sources. The light source controller 22 controls the respective light sources in the light source unit 20. The light path coupler 23 couples together light paths of light from the light source unit 20.

The light source unit 20 includes four LEDs (light emitting diodes) as light sources, which are a violet LED 20a (V), a blue LED 20b (B), a green LED 20c (G) and a red LED 20d (R).

Figure 3:
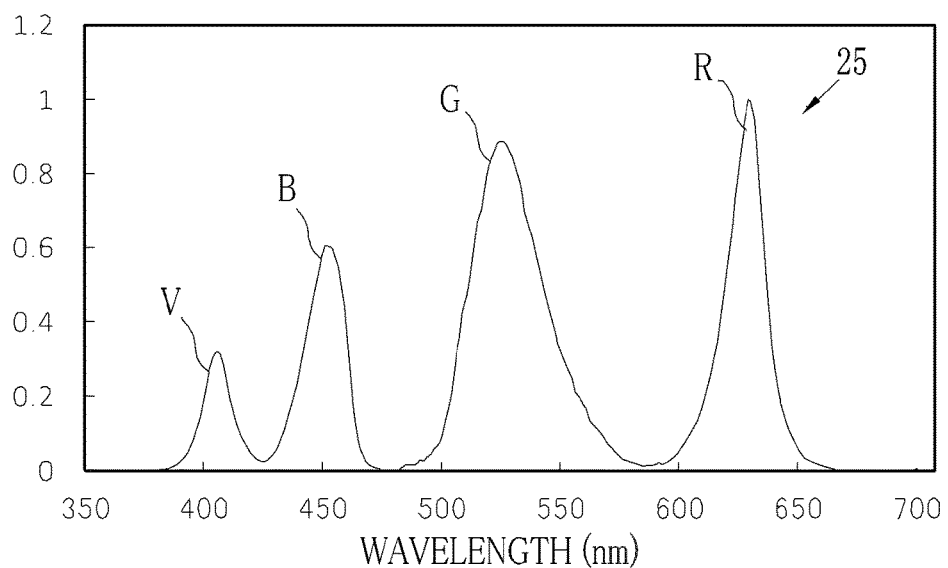
FIG. 3 is a graph illustrating an emission spectrum of polychromatic light.

In FIG. 3, the violet LED 20a is a violet light source for emitting violet light with a central wavelength of 405 nm and a wavelength range of 380-420 nm. The blue LED 20b is a blue light source for emitting blue light with a central wavelength of 450 nm and a wavelength range of 420-490 nm. The green LED 20c is a green light source for emitting green light with a central wavelength of 524-525 nm and a wavelength range of 480-590 nm. The red LED 20d is a red light source for emitting red light with a central wavelength of 628-629 nm and a wavelength range of 580-700 nm. Note that the central wavelengths of those light components of the LEDs 20a-20d are in a band width from plus or minus 5 nm to plus or minus 10 nm.

Figure 4:
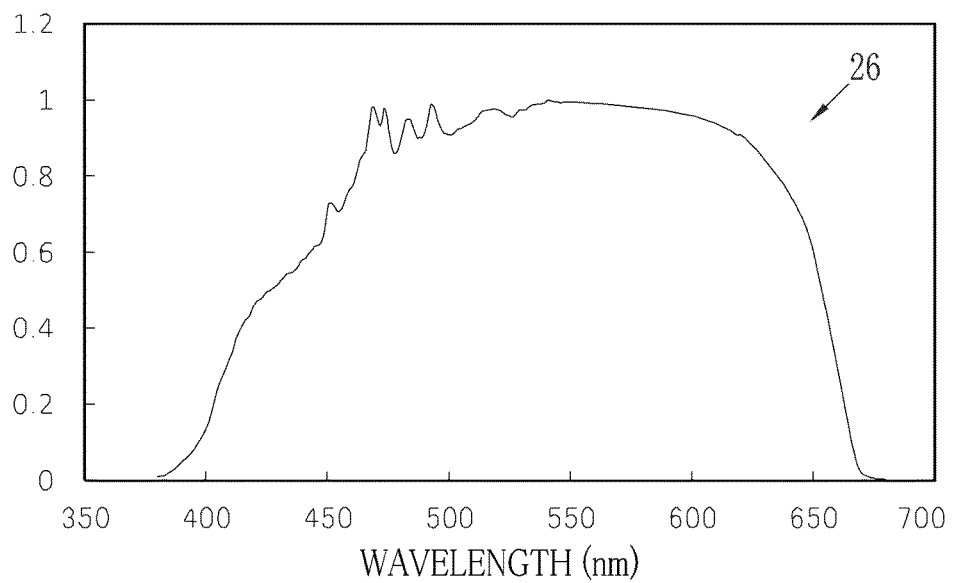
FIG. 4 is a graph illustrating an emission spectrum of continuous spectrum light from a xenon lamp.

The light source unit 20 generates polychromatic light having a polychromatic spectrum with violet, blue, green and red light components by use of plural light sources for discretely generating color light with different colors. The wavelength range of the violet LED 20a overlaps with that of the blue LED 20b. The wavelength range of the blue LED 20b overlaps with that of the green LED 20c. The wavelength range of the green LED 20c overlaps with that of the red LED 20d. Intensities of the LEDs 20a-20d are controllable discretely, so that an emission spectrum of the polychromatic light is changeable with changes in the intensities of the LEDs 20a-20d. The light source unit 20 in the embodiment generates violet, blue, green and red light in a particular balance of emulation of imaging with illumination of continuous spectrum light 26 or broadband light (as a target of emulation for improved whiteness) or white light with a broad band generated by a xenon lamp, which has been used in a known endoscope system of FIG. 4. Light generated by the light source unit 20 in a distribution emulation mode (xenon emulation mode) is referred to as first polychromatic light. In FIG. 3, first polychromatic light 25 or first multi color spectrum light or first controllable light of the embodiment has an emission spectrum as depicted. The emission spectrum of the first polychromatic light 25 is a first emission spectrum.

The light source controller 22 controls intensities and lighting sequences of light from the LEDs 20a-20d by specifically controlling a current or voltage of driving the LEDs 20a-20d, or controlling a pulse width, pulse length or the like for inputting the current or voltage to the LEDs 20a-20d. In the embodiment, the light source controller 22 turns on the LEDs 20a-20d simultaneously and controls a ratio of the intensities of the LEDs 20a-20d to emit the first polychromatic light 25 from the light source unit 20. Thus, the light source controller 22 corrects a first ratio related to the first polychromatic light 25 to become equal to a second ratio related to the continuous spectrum light 26. The first ratio is for the integrated emission intensity of the respective colors for the first polychromatic light 25 received by pixels of plural colors in an image sensor 48. The second ratio is for the integrated emission intensity of the respective colors for the continuous spectrum light 26 received by pixels of plural colors in the image sensor 48.

The integrated emission intensity is an amount of signal charge obtained by the image sensor 48 for photoelectric conversion at pixels of plural colors. According to a type or setting of the image sensor 48, control gains are used at different levels between the colors, to output an image signal by reading out the signal charge. However, the integrated emission intensity is not dependent upon the control gains used in reading out the signal charge in the image sensor 48. The integrated emission intensity is not dependent upon signal processing of the processing apparatus 16 for the image signal, either. In the embodiment, the integrated emission intensity is calculated by integration of a product of multiplication for respective wavelength ranges of the color filters, the product being obtained from intensity of the emission spectrum of the first polychromatic light from the light source unit 20 (or the continuous spectrum light 26 of the xenon lamp) and sensitivity of an optical spectrum of the color filters of the image sensor 48 for the respective wavelength ranges.

The continuous spectrum is an emission spectrum of light having at least a partial wavelength range of light emitted by a white color light source. The continuous spectrum light is light having the continuous spectrum. The white color light source emits light of a distribution of a gently rising and falling curve of a visible light range by use of a single light source, for example, 400-700 nm. Examples of the white light sources are a xenon lamp, halogen lamp, white LED and the like. Note that the light having a partial wavelength range of the light emitted by the white color light source is a light component extracted from the light of the white light source by use of a color filter or the like.

The polychromatic spectrum is one emission spectrum obtained by combining spectra of light components emitted by plural light sources. The polychromatic spectrum is light obtained by combining the light components emitted by the plural light sources. A broad band is a larger range than a wavelength range of light emitted by at least one light source among the plural light sources (the LEDs 20a-20d) in the light source unit 20. White light from the xenon lamp has a broader band than the wavelength ranges of violet light (violet wavelength range) from the violet LED 20a, blue light (blue wavelength range) from the blue LED 20b, green light (green wavelength range) from the green LED 20c, and red light (red wavelength range) from the red LED 20d, and includes various components of wavelengths included in the total wavelength range (350-700 nm). Distribution of the white light is on a single curve extending in the range of visible light. Therefore, the continuous spectrum light 26 of the broad band is white light emitted by the xenon lamp.

The first polychromatic light 25 or controllable light from the light source unit 20 becomes incident upon a light guide device 41, which is entered in the elongated tube 12a through the light path coupler 23. The light guide device 41 passes through the endoscope 12 and a universal cable for connection of the endoscope 12 to the light source apparatus 14 and the processing apparatus 16, and conducts light from the light path coupler 23 to the endoscope tip 12d of the endoscope 12. An available example of the light guide device 41 is a multi mode fiber, for example, a fiber cable of a fine diameter having a core diameter of 105 μm, clad diameter of 125 μm and a total diameter of 0.3-0.5 mm inclusive of a protective layer or outer layer.

The endoscope tip 12d of the endoscope 12 includes a lighting lens system 30a and an imaging lens system 30b. A lighting lens 45 in the lighting lens system 30a outputs light transmitted by the light guide device 41 for emission to an object of interest. The imaging lens system 30b includes an objective lens 46, a zoom lens 47 (variator lens) and the image sensor 48. Image light or returned light (including reflected light and fluorescence from tissue) from the object of interest is passed through the objective lens 46 and the zoom lens 47 and becomes incident upon the image sensor 48. Thus, an image of the object of interest is focused on the image sensor 48. In case the zoom switch 13 is manually operated, the zoom lens 47 is moved between a telephoto end and a wide-angle end, to enlarge or reduce the object image on the image sensor 48.

Figure 5:
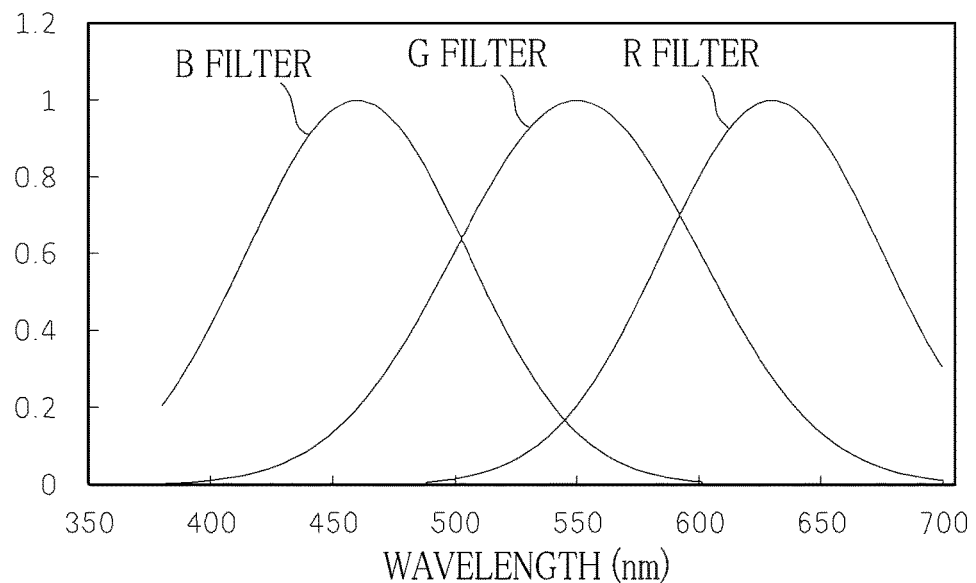
FIG. 5 is a graph illustrating an optical spectrum of color filters.

The image sensor 48 has numerous pixels of plural colors which are sensitive to respective colors different from one another. In other words, the optical spectra of the color filters at the pixels are different from one another. The image sensor 48 is a color image sensor of a primary color type having color filters of primary colors of blue, green and red, and outputs image signals of the colors by detecting image light from an object of interest with the pixels of the colors. Available examples of the image sensor 48 are a CCD image sensor (charge coupled device image sensor), CMOS image sensor (complementary metal oxide semiconductor image sensor) and the like. In FIG. 5, optical spectra of a blue color filter (B filter), green color filter (G filter) and red color filter (R filter) are illustrated. One of the blue, green and red color filters is associated with each one of the pixels of the image sensor 48.

The blue pixels having the blue color filters receive a blue light component which is included in the image light from the object of interest and passed through the blue color filters. The green pixels having the green color filters receive a green light component which is included in the image light from the object of interest and passed through the green color filters. Similarly, the red pixels having the red color filters receive a red light component which is included in the image light from the object of interest and passed through the red color filters. In case the light source unit 20 generates the first polychromatic light 25, the blue pixels receive violet and blue light components of the image light in the first polychromatic light 25, and output a blue image signal. At the same time, the green pixels receive a green light component of the image light in the first polychromatic light 25, and output a green image signal. Also, the red pixels receive a red light component of the image light in the first polychromatic light 25, and output a red image signal.

A CDS/AGC device 50 is supplied with the image signals of the respective colors from the image sensor 48. The CDS/AGC device 50 performs correlated double sampling (CDS) and automatic gain control (AGC) to the image signals as analog signals. An A/D converter 51 converts the image signals processed by the CDS/AGC device 50 into digital image signals. The digital image signals are input to the processing apparatus 16.

The processing apparatus 16 includes an input terminal 53 or receiver, a digital signal processor 56 or DSP, a noise reducer 58 (noise eliminator), an image generator 62 and a video signal generator 66.

The input terminal 53 receives red, green and blue image signals of a digital form from the endoscope 12. The digital signal processor 56 processes the received image signals for signal processing of various functions, such as defect correction, offset processing, gain correction, linear matrix processing, gamma conversion, demosaicing and the like. In the defect correction, a signal of defective pixels in the image sensor 48 is corrected. In the offset processing, a component of dark current is removed from the red, green and blue image signals after the defect correction, accurately to determine a zero level. In the gain correction, the red, green and blue image signals after the offset processing are multiplied with a particular gain to adjust the signal level. The linear matrix processing is performed for the red, green and blue image signals after the gain correction for higher color rendering. Then the gamma conversion is performed to adjust the brightness and chroma. The demosaicing is performed for the red, green and blue image signals after the linear matrix processing, to produce the signals of the colors of shortage at respective pixels by interpolation. Then all of the pixels come to have the signals of all of the red, green and blue colors.

After demosaicing in the digital signal processor 56, the noise reducer 58 processes the image signals for the noise reduction, for example, according to the movement average method, median filter method or the like. The image signals after the noise reduction are input to the image generator 62.

The image generator 62 processes the red, green and blue image signals for color conversion, color enhancement and structural enhancement, to produce an endoscopic image. The color conversion is processing according to 3×3 matrix processing, gradation conversion and three-dimensional look-up table processing (LUT). The color enhancement is for the image signals after the color conversion. The structural enhancement is processing of enhancing a structure of the object of interest, for example, surface blood vessel and pit patterns, and used for the image signals after the color enhancement. The endoscopic image is the color image after the image processing of the functions including the structural enhancement. The video signal generator 66 converts the image from the image generator 62 into a video signal in a displayable form for the monitor display panel 18. The monitor display panel 18 is driven to display the image.

A characteristic of the first polychromatic light 25 for use in illumination in a distribution emulation mode (xenon emulation mode) in the endoscope system 10 of the embodiment is described now. Also, a method of obtaining an intensity ratio of violet, blue, green and red light in the first polychromatic light 25 is described.

Figure 6:
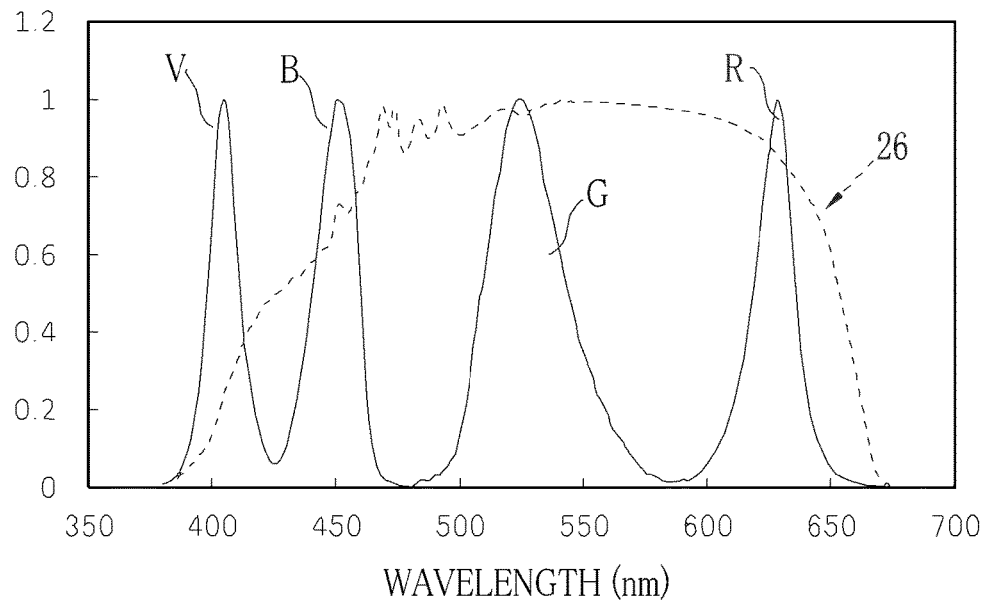
FIG. 6 is a graph illustrating emission spectra of components of violet, blue, green and red light and the continuous spectrum light.

Although the light source controller 22 can change an intensity ratio between components of the violet, blue, green and red light as required, but cannot perform color rendering of the emission spectrum of the continuous spectrum light 26 of the xenon lamp of FIG. 6 only by adjusting the intensity ratio. For example, even in case the intensity of the violet and blue light is set as high as that of the continuous spectrum light 26, an intensity of light components of an intermediate wavelength range (intermediate color) of approximately 420-430 nm is lower than that of the counterpart of the continuous spectrum light 26. Assuming that the intensity of the light components of an intermediate wavelength range is set as high as that of the continuous spectrum light 26, an intensity of light components of central wavelengths of the violet and blue light is far higher than that of the counterpart of the continuous spectrum light 26.

The light source controller 22 corrects (adjusts) an intensity ratio of violet, blue, green and red light in such a manner that a ratio between the integrated emission intensity of the first polychromatic light 25 received at the blue pixels, that at the green pixels and that at the red pixels is corrected to become approximately equal to a ratio between the integrated emission intensity of the continuous spectrum light 26 received at the blue pixels, that at the green pixels and that at the red pixels. This is in contrast with color rendering of the continuous spectrum light 26 of the xenon lamp only by use of the LEDs 20a-20d. Even assuming that the emission spectrum is different between the first polychromatic light 25 and the continuous spectrum light 26 of the xenon lamp, an equal image signal is obtained by imaging an object of interest with the image sensor 48. Thus, a substantially equal endoscopic image is displayed on the monitor display panel 18. The endoscopic image can be obtained with the same image hue (visual form) of the object as that obtained by use of the xenon lamp even in spite of the difference in the emission spectrum.

Let Vb, Vg and Vr be integrated emission intensities of violet light included in the first polychromatic light 25 upon reception at the blue, green and red pixels. Let Bb, Bg and Br be integrated emission intensities of blue light included in the first polychromatic light 25 upon reception at the blue, green and red pixels. Let Gb, Gg and Gr be integrated emission intensities of green light included in the first polychromatic light 25 upon reception at the blue, green and red pixels. Let Rb, Rg and Rr be integrated emission intensities of red light included in the first polychromatic light 25 upon reception at the blue, green and red pixels.

The integrated emission intensity Vb of violet light received at the blue pixels is obtained by integrating a product of intensity of an emission spectrum of the violet light (FIG. 6) and sensitivity of an optical spectrum of the blue color filters (FIG. 5) for the respective wavelengths, the emission spectrum having a spectral peak (intensity of center wavelength) normalized at 1 (one). As the emission spectrum of the violet light and the optical spectrum of the blue color filters are known values, the integrated emission intensity Vb of the violet light received at the blue pixels is a known value. Other integrated emission intensities Vg, Vr, Bb, Bg, Br, Rb, Rg and Rr are known values.

Let Xb be an integrated emission intensity obtained by receiving the continuous spectrum light 26 of the xenon lamp with the blue pixels. Let Xg be an integrated emission intensity obtained by receiving the continuous spectrum light 26 of the xenon lamp with the green pixels. Let Xr be an integrated emission intensity obtained by receiving the continuous spectrum light 26 of the xenon lamp with the red pixels. The integrated emission intensity Xb is obtained by integrating a product of multiplication of intensity of the continuous spectrum light 26 of the xenon lamp with a normalized spectral peak of 1 (FIG. 4 or 6) and sensitivity of an optical spectrum of the blue color filter (FIG. 5). The emission spectrum of the continuous spectrum light 26 and the optical spectrum of the blue color filter (FIG. 5) are known information. The integrated emission intensity Xb obtained by receiving the continuous spectrum light 26 of the xenon lamp with the blue pixels is a known value. The remaining integrated emission intensities Xg and Xr are values determined in a similar manner.

Let Cv:Cb:Cg:Cr be an intensity ratio (continued ratio) of the violet, blue, green and red light in the first polychromatic light 25. Those terms of Cv, Cb, Cg and Cr are variable. A ratio between the integrated emission intensity of the first polychromatic light 25 received at the blue pixels, that at the green pixels and that at the red pixels is corrected to become equal to a ratio between the integrated emission intensity of the continuous spectrum light 26 of the xenon lamp received at the blue pixels, that at the green pixels and that at the red pixels.

The intensity ratio Cv:Cb:Cg:Cr of the violet, blue, green and red light included in the first polychromatic light 25 can be determined to satisfy the condition of Equation 1. However, the number of the variables is higher than the number of algebraic equations in Matrix Equation 1. There is no single solution of the intensity ratio Cv:Cb:Cg:Cr of the violet, blue, green and red light.

$$\begin{pmatrix} Xb \\ Xg \\ Xr \end{pmatrix} = Cv\begin{pmatrix} Vb \\ Vg \\ Vr \end{pmatrix} + Cb\begin{pmatrix} Bb \\ Bg \\ Br \end{pmatrix} + Cg\begin{pmatrix} Gb \\ Gg \\ Gr \end{pmatrix} + Cr\begin{pmatrix} Rb \\ Rg \\ Rr \end{pmatrix} \quad \text{Equation 1}$$

In the embodiment, an intensity ratio between the components of those received by the blue pixels is determined at first (ratio=Kv:Kb). To this end, a wavelength range of reception with the blue pixels is divided into a first wavelength range for the violet light (380-430 nm) and a second wavelength range for the blue light (430-480 nm). The intensity ratio Kv:Kb of the violet and blue light is so determined that the integrated emission intensity of the first wavelength range of the first polychromatic light 25 is equal to the integrated emission intensity of the first wavelength range of the continuous spectrum light 26 of the xenon lamp, and that the integrated emission intensity of the second wavelength range of the first polychromatic light 25 is equal to the integrated emission intensity of the second wavelength range of the continuous spectrum light 26 of the xenon lamp.

Let Vb1 and Vb2 be integrated emission intensities of the first and second wavelength ranges of violet light. Let Bb1 and Bb2 be integrated emission intensities of the first and second wavelength ranges of blue light. Let Xb1 and Xb2 be integrated emission intensities of the first and second wavelength ranges of the continuous spectrum light 26. The integrated emission intensity Vb1 of the first wavelength range of the violet light is obtained by integrating a product of intensity of the emission spectrum of the violet light and sensitivity of the optical spectrum of the blue color filter in a section of the first wavelength range. The integrated emission intensity Vb1 is a known amount because the emission spectrum of the violet light and the optical spectrum of the blue color filter are known information. The remaining integrated emission intensities Vb2, Bb1, Bb2, Xb1 and Xb2 are obtained similarly.

Figure 7:
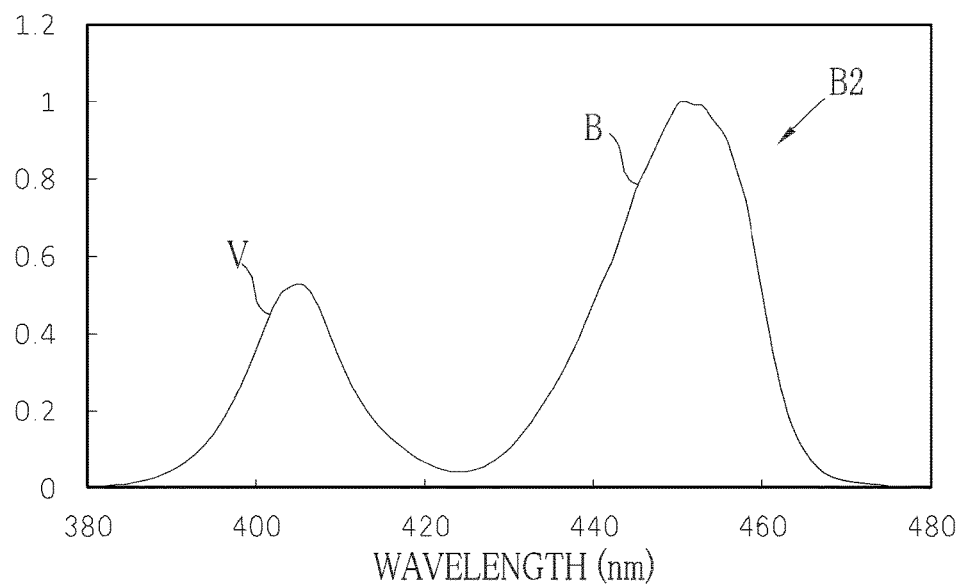
FIG. 7 is a graph illustrating a balance of the violet and blue light in polychromatic light.

Accordingly, the intensity ratio Kv:Kb of the violet and blue light can be obtained by Equation 2 indicated below. In the embodiment, Kv:Kb is approximately equal to 0.53:1 (or approximately 0.35:0.65) as illustrated in FIG. 7.

$$\begin{pmatrix} Xb1 \\ Xb2 \end{pmatrix} = Kv\begin{pmatrix} Vb1 \\ Vb2 \end{pmatrix} + Kb\begin{pmatrix} Bb1 \\ Bb2 \end{pmatrix} \quad \text{Equation 2}$$

Obtaining the intensity ratio Kv:Kb between the violet light and the blue light in the first polychromatic light 25 makes it possible to treat the mixed light of the violet light and the blue light as blue light virtually after mixing by this intensity ratio. See FIG. 7. Let B2 light be the mixed light or virtual blue light.

Let B2b be an integrated emission intensity of the B2 light upon reception at the blue pixels. Let B2g be an integrated emission intensity of the B2 light upon reception at the green pixels. Let B2r be an integrated emission intensity of the B2 light upon reception at the red pixels. An intensity ratio of B2, green and red light in the first polychromatic light 25 is Pb2:Pg:Pr. The ratio Pb2:Pg:Pr of the B2, green and red light can be obtained by Equation 3. In the embodiment, Pb2:Pg:Pr=1:1.64:1.65, namely approximately 0.24:0.36:0.40.

$$\begin{pmatrix} Xb \\ Xg \\ Xr \end{pmatrix} = Pb2 \begin{pmatrix} B2b \\ B2g \\ B2r \end{pmatrix} + Pg \begin{pmatrix} Gb \\ Gg \\ Gr \end{pmatrix} + Pr \begin{pmatrix} Rb \\ Rg \\ Rr \end{pmatrix} \qquad \text{Equation 3}$$

As the intensity ratio Kv:Kb of violet and blue light in the first polychromatic light 25 is determined and the intensity ratio Pb2:Pg:Pr of the B2, green and red light is determined, an intensity ratio Cv:Cb:Cg:Cr of violet, blue, green and red light for the first polychromatic light 25 can be acquired. In the embodiment, Cv:Cb:Cg:Cr=Kv/Kb:1:Pg/Pb2:Pr/Pb2=0.53:1:1.64:1.65, namely approximately 0.11:0.22:0.32:0.36.

The first polychromatic light 25 of FIG. 3 is light after combining the violet, blue, green and red light at the intensity ratio of Cv:Cb:Cg:Cr. The use of the first polychromatic light 25 at the ratio Cv:Cb:Cg:Cr for the violet, blue, green and red light in the endoscope system 10 produces a result in which a ratio of the integrated emission intensity between the plural colors of the first polychromatic light 25 received by plural pixels of the image sensor 48 is corrected to become equal to a ratio of the integrated emission intensity between the plural colors of the continuous spectrum light 26 of the xenon lamp received by plural pixels of the image sensor 48.

Let a first integrated emission intensity (CvVb+CbBb+CgGb+CrRb) be an amount at the blue pixels in the use of the first polychromatic light 25. Let a second integrated emission intensity (CvVg+CbBg+CgGg+CrRg) be an amount at the green pixels in the use of the first polychromatic light 25. A ratio value (CvVb+CbBb+CgGb+CrRb)/(CvVg+CbBg+CgGg+CrRg) of the first integrated emission intensity (CvVb+CbBb+CgGb+CrRb) to the second integrated emission intensity (CvVg+CbBg+CgGg+CrRg) becomes equal to a ratio value Xb/Xg of an integrated emission intensity Xb at the blue pixels to an integrated emission intensity Xg at the green pixels in the use of the continuous spectrum light 26 of the xenon lamp. See Equation 1. Let a third integrated emission intensity (CvVr+CbBr+CgGr+CrRr) be an amount at the red pixels in the use of the first polychromatic light 25. A ratio value (CvVr+CbBr+CgGr+CrRr)/(CvVg+CbBg+CgGg+CrRg) of the third integrated emission intensity (CvVr+CbBr+CgGr+CrRr) to the second integrated emission intensity (CvVg+CbBg+CgGg+CrRg) becomes equal to a ratio value Xr/Xg of an integrated emission intensity Xr at the red pixels to the integrated emission intensity Xg at the green pixels in the use of the continuous spectrum light 26 of the xenon lamp.

The use of the first polychromatic light 25 sets the color balance of the image signals from the image sensor 48 (color rendering) approximately equal to that by use of the continuous spectrum light 26 of the xenon lamp. In the endoscope system 10, the image hue (visual form) of the object of interest can be the same as that according to the continuous spectrum light 26 of the xenon lamp. Various data, such as the gain, matrix and the like, can be used in the same manner as the known techniques of endoscopy without requirement of redetermining those for use in the signal processing in the digital signal processor 56, noise reduction in the noise reducer 58, or image processing in the image generator 62.

In the embodiment with the image sensor 48 having the blue (first color), green (second color) and red (third color) pixels, the light source controller 22 generates violet, blue, green and red light at the intensity ratio of Cv:Cb:Cg:Cr, so as to set a ratio of an integrated emission intensity of blue light at the blue pixels equal and an integrated emission intensity of green light at the green pixels equal between the use of the first polychromatic light 25 and the use of the continuous spectrum light 26, and to set a ratio of an integrated emission intensity of red light at the red pixels equal and an integrated emission intensity of the green light at the green pixels equal between the use of the first polychromatic light 25 and the use of the continuous spectrum light 26.

The first polychromatic light 25 has lower amounts of wavelength components of partial wavelength ranges than the continuous spectrum light 26 of the xenon lamp, for example, intermediate wavelength ranges (intermediate colors) between violet and blue components. However, information of structures can be expressed by use of light of the respective colors in the first polychromatic light 25, the information being related to a structure near to a surface layer of the mucosa having surface blood vessels or a pit pattern, or a structure of a deep layer or intermediate deep layer under the mucosa, such as deep blood vessels or intermediate deep blood vessels. Therefore, image hue (visual form) of the object of interest by use of the first polychromatic light 25 can be set approximately equal to that by use of the continuous spectrum light 26 of the xenon lamp in the endoscope system 10. In other words, the light with the intermediate wavelength ranges between the violet and blue components included in the continuous spectrum light 26 of the xenon lamp contributes at a smaller amount to image hue of the structure of the surface blood vessels or the deep or intermediate deep blood vessels than light of the respective colors in the first polychromatic light 25. The light with the intermediate wavelength ranges between the violet and blue components is only effective in raising brightness of an endoscopic image. Thus, the first polychromatic light 25 can be used sufficiently without shortage for the endoscopic imaging.

In relation to the ratio of the integrated emission intensity of the first polychromatic light 25 between the plural colors received by pixels of the plural colors of the image sensor 48, an error of at least 5-10% is tolerable with reference to the ratio of the integrated emission intensity of the continuous spectrum light 26 between the plural colors received by pixels of the plural colors. Image hue (visual form) of the image of the object of interest can be approximately equal to that according to the use of the continuous spectrum light 26 of the xenon lamp in this error range, because sight of human eyes is not exactly aware of a small difference between the color distributions of light. The ratios can be regarded as approximately equal to one another. In the specification, the condition of the equality includes a condition of approximate equality in relation to the ratio of the integrated emission intensity of the first polychromatic light 25 between the plural colors received at pixels of the plural colors in the image sensor 48 and the ratio of the integrated emission intensity of the continuous spectrum light 26 between the plural colors received at pixels of the plural colors.

Second Embodiment

Figure 8:
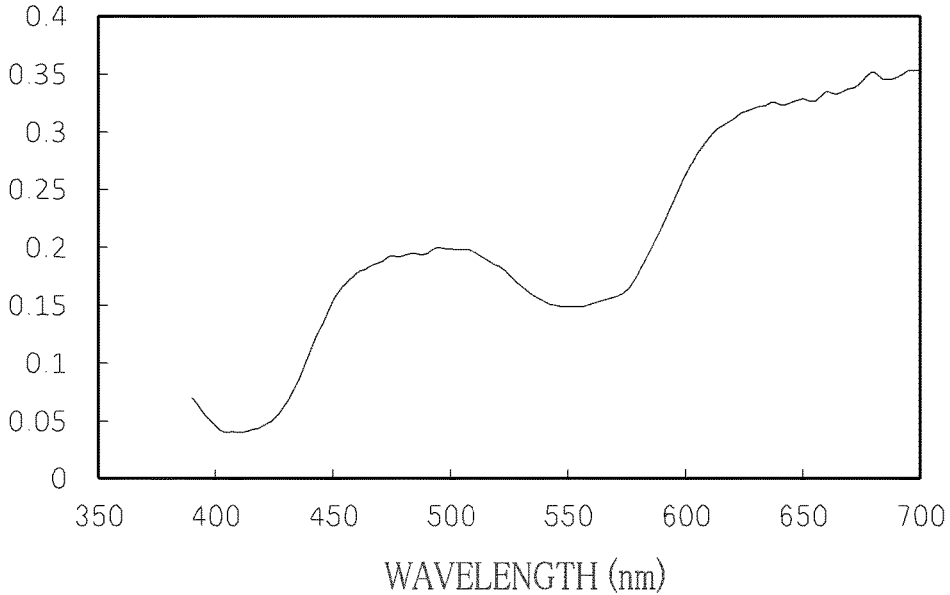
FIG. 8 is a graph illustrating reflectance of an esophagus.

An example of an object of interest in the endoscope system 10 is an esophagus. Reflectance of the esophagus is different according to the wavelengths as illustrated in FIG. 8. In FIG. 9, polychromatic light 201 or multi color spectrum light or controllable light is used, in which the respective spectral peaks of the violet, blue, green and red light are normalized as "1". Image light 202 or returned light from the esophagus is changeable according to the reflectance of the esophagus. In FIG. 10, the continuous spectrum light 26 from the xenon lamp is used. Image light 203 or returned light from the esophagus is changeable according to the reflectance of the esophagus. Note that the intensity according to the reflectance of the esophagus includes an intensity of reflected light from the esophagus and an intensity of fluorescence generated by tissue in the esophagus, such as mucosa. The image light 202 includes the reflected light of the polychromatic light 201 and the fluorescence generated by the esophagus upon reflecting the polychromatic light 201. The image light 203 is determined in the same manner.

Components of the image light 202 and 203 from the esophagus are changeable according to reflectance of the tissue. In the second embodiment, the light source controller 22 controls an intensity ratio of violet, blue, green and red light in such a manner that a ratio of the integrated emission intensity of the image light 202 of the polychromatic light 201 between the plural colors received by pixels of plural colors in the image sensor 48 is corrected to become equal to a ratio of the integrated emission intensity of the continuous spectrum light 26 of the xenon lamp between the plural colors received by pixels of plural colors in the image sensor 48.

Figure 11:
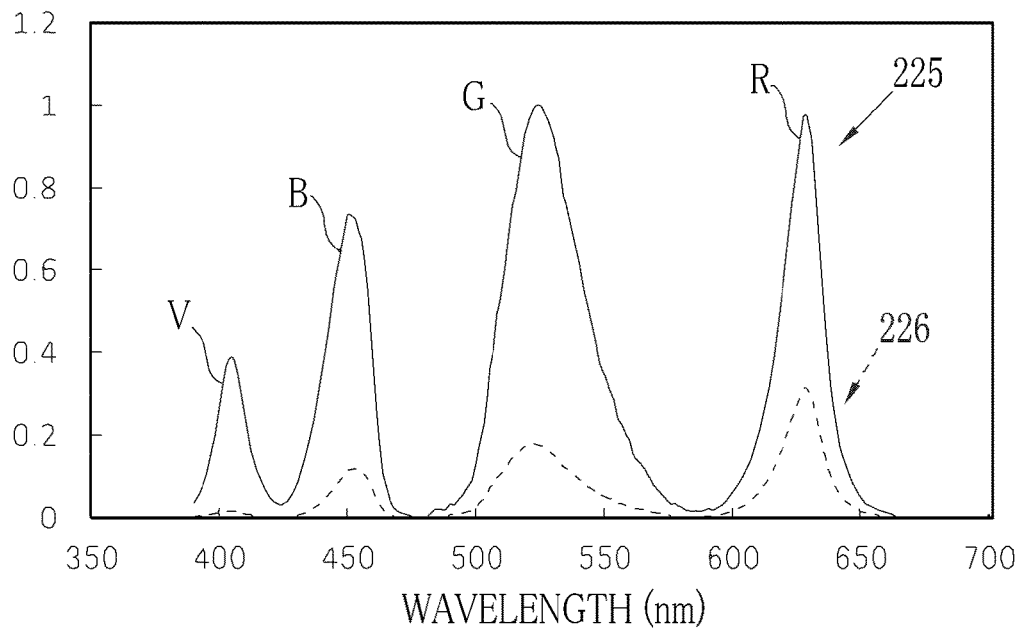
FIG. 11 is a graph illustrating polychromatic light in consideration of reflectance.

In FIG. 11, first polychromatic light 225 or first multi color spectrum light or first controllable light is obtained by control in which the ratio of the integrated emission intensity of the image light from the esophagus between the plural colors received by pixels of the colors in the image sensor 48 is corrected to become equal to the ratio of the integrated emission intensity of the continuous spectrum light 26 of the xenon lamp between the plural colors received by pixels of the colors in the image sensor 48. An integrated emission intensity curve 226 expresses changes in the image light from the esophagus illuminated with the first polychromatic light 225.

Data of the image light 202 and 203 are used for obtaining the values in Equations 1-3 in place of the violet, blue, green and red light and the continuous spectrum light 26. An intensity ratio Cv:Cb:Cg:Cr for the first polychromatic light 225 can be obtained in the same manner as the first embodiment. For example, the ratio Cv:Cb:Cg:Cr for the first polychromatic light 225 is 0.53:1:1.36:1.33 (approximately 0.13:0.24:0.32:0.32). Note that Kv:Kb for the first polychromatic light 225 is 1.05:1.98 (approximately 0.35:0.65) and Pb2:Pg:Pr=2.02:2.75:2.69 (approximately 0.27:0.37:0.36).

Accordingly, the use of the first polychromatic light 225 in which the intensity ratio of the violet, blue, green and red light by considering the form of the particular object of interest makes it possible to set the image hue (visual form) of the object of interest correctly equal to that according to the use of the continuous spectrum light 26 of the xenon lamp.

Figure 12:
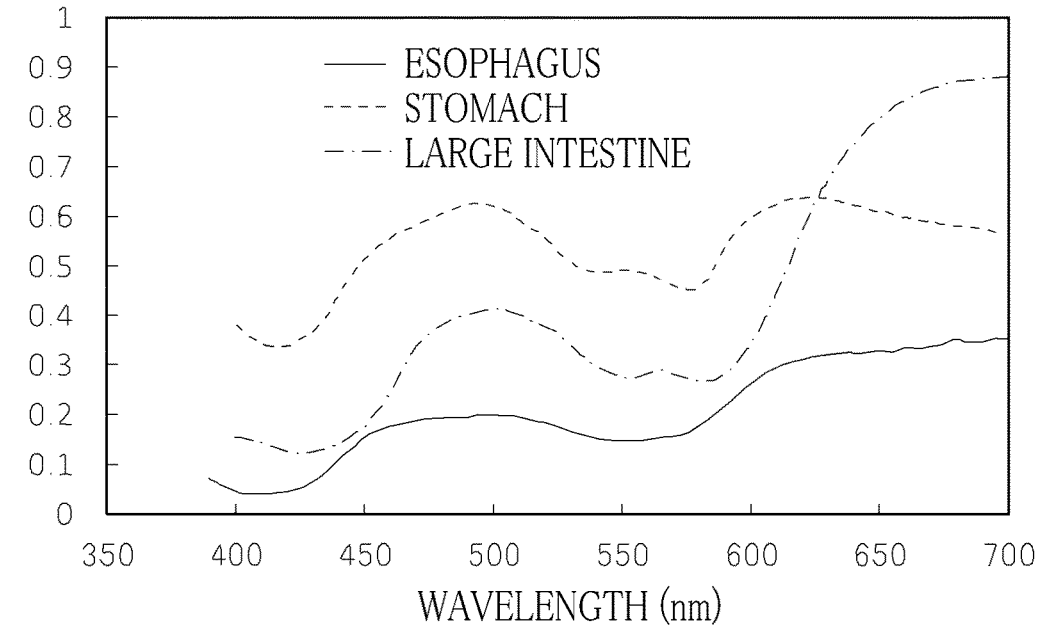
FIG. 12 is a graph illustrating reflectance of the esophagus, stomach and large intestine.

Reflectance of an object of interest is different between types of the object of interest and portions of the object of interest. For example, the stomach and large intestine are viewed by the endoscope system 10 in addition to the esophagus. However, there are differences in the reflectance between the esophagus, stomach and large intestine for the wavelengths. See FIG. 12. Thus, a light intensity ratio of the violet, blue, green and red light in the first polychromatic light 225 in consideration of the reflectance of the esophagus is different from a light intensity ratio of the violet, blue, green and red light in the first polychromatic light 225 in consideration of the reflectance of the stomach. Also, a light intensity ratio of the violet, blue, green and red light in the first polychromatic light 225 in consideration of the reflectance of the large intestine is different from those related to the esophagus and stomach. It is preferable suitably to control the light intensity ratio of the violet, blue, green and red light in the first polychromatic light 225 by considering the types of the objects of interest, such as the esophagus, stomach and large intestine.

Figure 13:
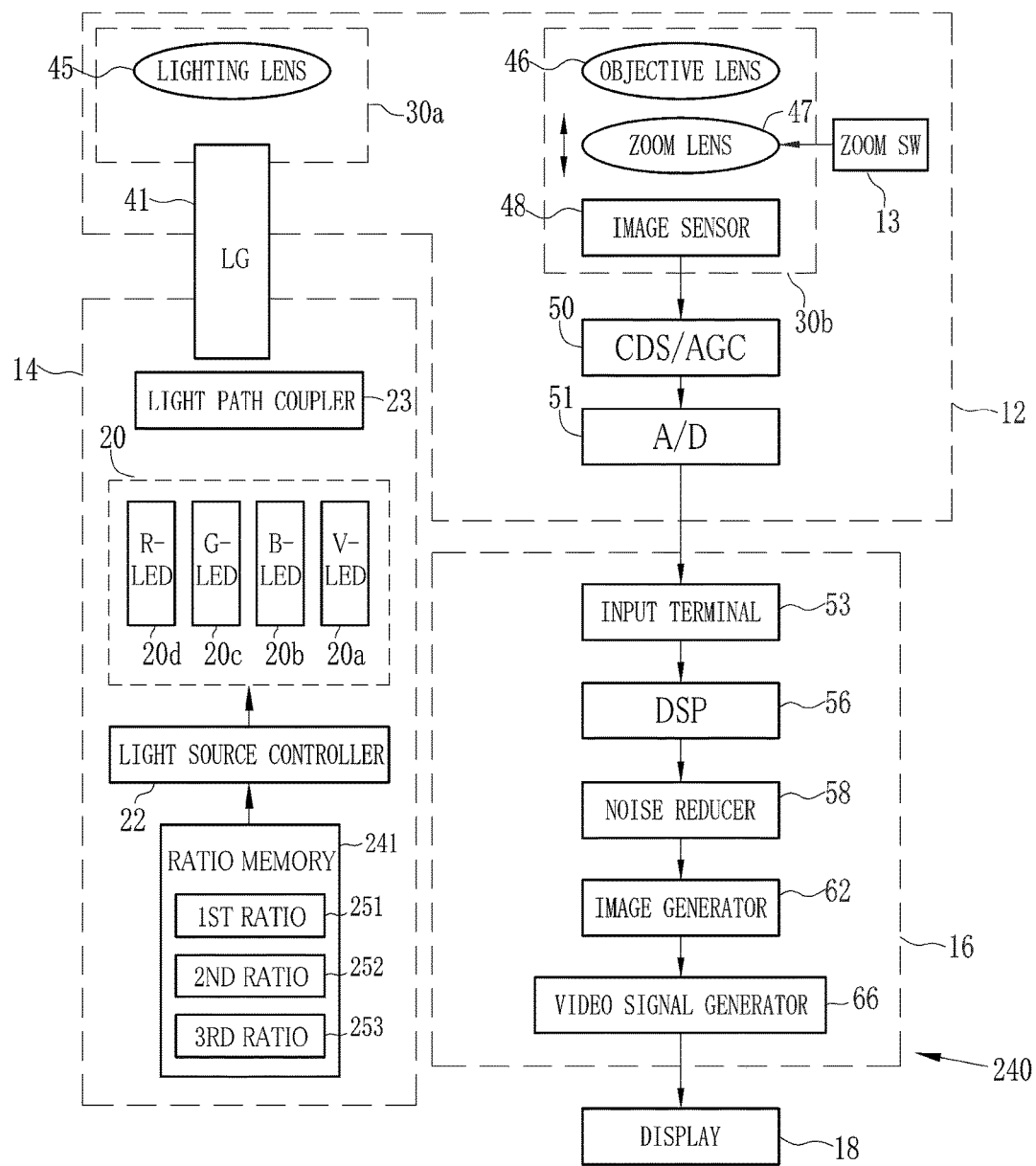
FIG. 13 is a block diagram schematically illustrating a preferred endoscope system in which an intensity ratio between the colors is changed according to an endoscope type.

In FIG. 13, an endoscope system 240 includes a ratio memory 241 or ratio storage medium for storing light intensity ratios of light intensity (light energy) between the violet light, blue light, green light and red light for the respective types of objects of interest. For example, the ratio memory 241 stores a first ratio 251 for the esophagus, a second ratio 252 for the stomach, and a third ratio 253 for the large intestine. For use of the first polychromatic light, the light source controller 22 selects one light intensity ratio according to the type of the object of interest among the plural light intensity ratios stored in the ratio memory 241, for controlling the violet light, the blue light, the green light and the red light at the selected light intensity ratio. Assuming that the object of interest is the stomach, the light source controller 22 selects the second ratio 252 from the ratio memory 241, to control the violet light, the blue light, the green light and the red light at the second ratio 252. Thus, the first polychromatic light according to the type of the object can be generated.

Although the ratio memory 241 is incorporated in the light source apparatus 14, the ratio memory 241 in the endoscope system 240 may be incorporated in the processing apparatus 16 or in the endoscope 12. Arrangement of the ratio memory 241 is not limited in a condition of selecting a suitable light intensity ratio in the light source controller 22 according to the type of the object of interest.

Third Embodiment

Figure 14:
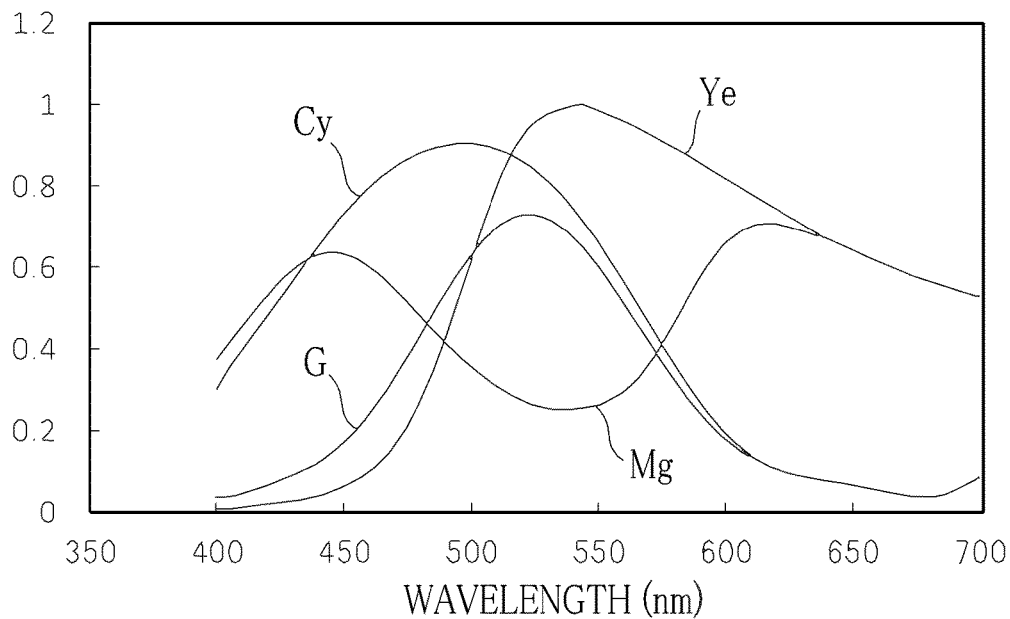
FIG. 14 is a graph illustrating an emission spectrum of color filters of a complementary color type.

The image sensor 48 having the color filters of the primary colors is used in the first and second embodiments. However, a color image sensor of a complementary color type having color filters of complementary colors can be used in the endoscope system 10 or 240 in place of the image sensor 48. The color filters of the complementary colors include cyan, magenta and yellow color filters (Cy, Mg and Ye). In FIG. 14, the color filters of the embodiment also include green color filters (G) in addition to the cyan, magenta and yellow color filters. In short, the image sensor 48 of the embodiment includes cyan pixels (Cy), magenta pixels (Mg), yellow pixels (Ye) and green pixels (G).

In case the color image sensor of the complementary color type is used for the image sensor 48, the first polychromatic light is different from the first polychromatic light 25 and 225 of the first and second embodiments in relation to the intensity ratio of the violet, blue, green and red light, in a condition of setting image hue (visual form) of the object of interest equal to that by use of the continuous spectrum light 26 of the xenon lamp. It is necessary to use the intensity ratio of the violet, blue, green and red light for the color image sensor of the complementary color type.

Let Vcy be an integrated emission intensity of violet light included in the first polychromatic light for the color image sensor of the complementary colors upon reception at the cyan pixels. Let Vmg, Vye and Vg be integrated emission intensities of violet light included in the first polychromatic light for the color image sensor of the complementary colors upon reception at the magenta, yellow and green pixels. Let Bcy be an integrated emission intensity of blue light included in the first polychromatic light for the color image sensor of the complementary colors upon reception at the cyan pixels. Let Bmg, Bye and Bg be integrated emission intensities of blue light included in the first polychromatic light for the color image sensor of the complementary colors upon reception at the magenta, yellow and green pixels. Let Gcy be an integrated emission intensity of green light included in the first polychromatic light for the color image sensor of the complementary colors upon reception at the cyan pixels. Let Gmg, Gye and Gg be integrated emission intensities of green light included in the first polychromatic light for the color image sensor of the complementary colors upon reception at the magenta, yellow and green pixels. Let Rcy be an integrated emission intensity of red light included in the first polychromatic light for the color image sensor of the complementary colors upon reception at the cyan pixels. Let Rmg, Rye and Rg be integrated emission intensities of red light included in the first polychromatic light for the color image sensor of the complementary colors upon reception at the magenta, yellow and green pixels. Those values of the integrated emission intensities are known values in the same manner as the first and second embodiments.

Let Xcy be an integrated emission intensity of the continuous spectrum light 26 of the xenon lamp upon reception at the cyan pixels. Let Xmg be an integrated emission intensity of the continuous spectrum light 26 of the xenon lamp upon reception at the magenta pixels. Let Xye be an integrated emission intensity of the continuous spectrum light 26 of the xenon lamp upon reception at the yellow pixels. Let Xg be an integrated emission intensity of the continuous spectrum light 26 of the xenon lamp upon reception at the green pixels. Those integrated emission intensities are known values in the same manner as the first and second embodiments.

An intensity ratio (continued ratio) of the violet, blue, green and red light in the first polychromatic light for the color image sensor of the complementary color type is a ratio Cv:Cb:Cg:Cr in the same manner as the first and second embodiments. Terms of Cv, Cb, Cg and Cr are variables, and are so determined that a ratio of the integrated emission intensity of the first polychromatic light for the color image sensor of the complementary color type received by the pixels of the complementary colors is corrected to become equal to a ratio of the integrated emission intensity of the continuous spectrum light 26 of the xenon lamp received by the pixels of the complementary colors. In short, the intensity ratio Cv:Cb:Cg:Cr of the violet, blue, green and red light in the first polychromatic light for the color image sensor of the complementary color type can be determined to satisfy the condition of Equation 4 indicated below. Matrix Equation 4 is solvable because the number of the variables is equal to the number of the algebraic equations, so that the intensity ratio Cv:Cb:Cg:Cr of the violet, blue, green and red light can be acquired by solving Equation 4.

$$\begin{pmatrix} Xcy \\ Xmg \\ Xye \\ Xg \end{pmatrix} = Cv \begin{pmatrix} Vcy \\ Vmg \\ Vye \\ Vg \end{pmatrix} + Cb \begin{pmatrix} Bcy \\ Bmg \\ Bye \\ Bg \end{pmatrix} + Cg \begin{pmatrix} Gcy \\ Gmg \\ Gye \\ Gg \end{pmatrix} + Cr \begin{pmatrix} Rcy \\ Rmg \\ Rye \\ Rg \end{pmatrix} \quad \text{Equation 4}$$

Furthermore, the intensity ratio Cv:Cb:Cg:Cr of the violet, blue, green and red light constituting the first polychromatic light for the color image sensor of the complementary color can be calculated by the method which will be described below.

Figure 15:
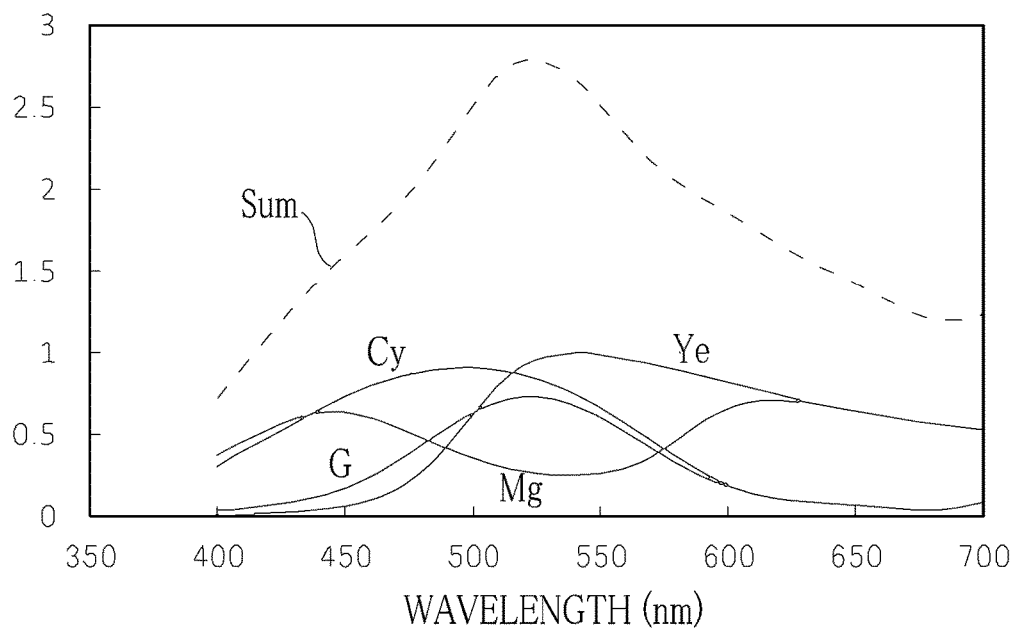
FIG. 15 is a graph illustrating sensor sensitivity (total sensitivity) of a color image sensor of the complementary color type.

In FIG. 15, sensitivity values of the color filters of cyan, magenta, yellow and green are added up for respective wavelength values, to obtain a sensor sensitivity Sum (total sensitivity) of the color image sensor of the complementary color type. Pixels of the color image sensor are virtually regarded as S pixels each of which has a color filter with the sensor sensitivity Sum.

Then the wavelength range is divided into four, namely, a first wavelength range of violet light (380-430 nm), a second wavelength range of blue light (430-480 nm), a third wavelength range of green light (480-580 nm) and a fourth wavelength range of red light (580-700 nm). Let VS1, VS2, VS3 and VS4 be integrated emission intensities of the first to fourth wavelength ranges by receiving violet light with the S pixels in the first polychromatic light for the color image sensor of the complementary color type.

Let BS1, BS2, BS3 and BS4 be integrated emission intensities of the first to fourth wavelength ranges by receiving blue light with the S pixels in the first polychromatic light for the color image sensor of the complementary color type. Let GS1, GS2, GS3 and GS4 be integrated emission intensities of the first to fourth wavelength ranges by receiving green light with the S pixels in the first polychromatic light for the color image sensor of the complementary color type. Let RS1, RS2, RS3 and RS4 be integrated emission intensities of the first to fourth wavelength ranges by receiving red light with the S pixels in the first polychromatic light for the color image sensor of the complementary color type. Let XS1, XS2, XS3 and XS4 be integrated emission intensities of the first to fourth wavelength ranges by receiving the continuous spectrum light 26 of the xenon lamp with the S pixels.

The integrated emission intensity VS1 is calculated by integrating the product between intensity of the emission spectrum of the violet light and the total sensitivity Sum for the respective wavelengths in a range of the first wavelength range. The other integrated emission intensities are calculated in the same manner, including VS2, VS3, VS4, BS1, BS2, BS3, BS4, GS1, GS2, GS3, GS4, RS1, RS2, RS3, RS4, XS1, XS2, XS3 and XS4.

Figure 16:
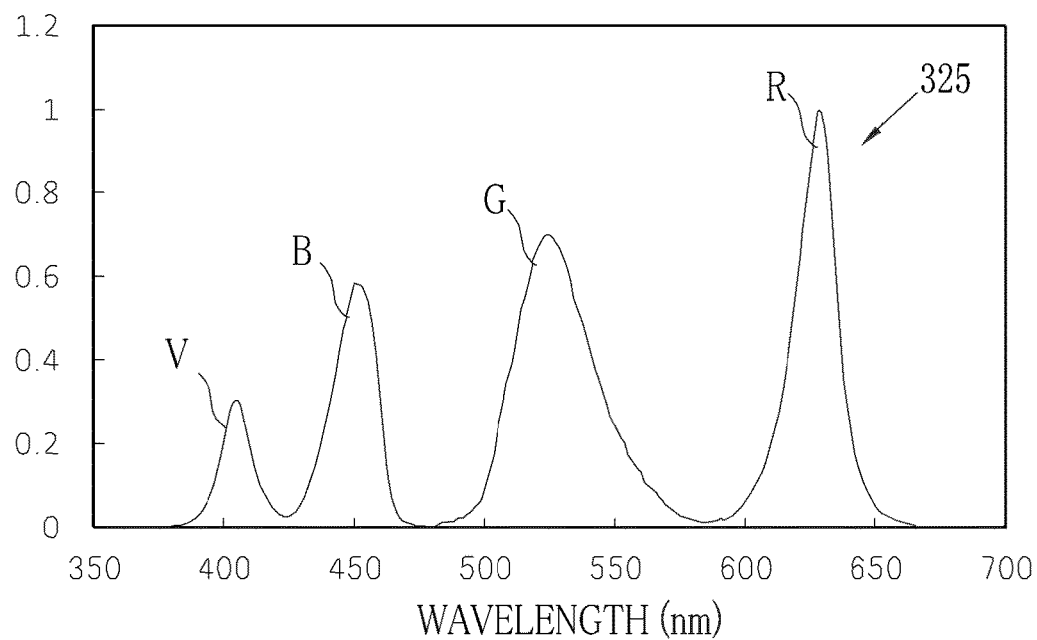
FIG. 16 is a graph illustrating polychromatic light for the color image sensor of the complementary color type.

The intensity ratio Cv:Cb:Cg:Cr of the violet, blue, green and red light for the first polychromatic light for the color image sensor of the complementary color type is obtained by use of Equation 5 instead of Equation 4. In relation to the color image sensor having the complementary color filters of FIG. 14 in the embodiment, the intensity ratio Cv:Cb:Cg:Cr is approximately 0.12:0.23:0.27:0.39. In FIG. 16, first polychromatic light 325 or first multi color spectrum light or first controllable light is illustrated, and is obtained from the violet, blue, green and red light of the intensity ratio according to Equation 5.

$$\begin{pmatrix} XS1 \\ XS2 \\ XS3 \\ XS4 \end{pmatrix} = Cv \begin{pmatrix} VS1 \\ VS2 \\ VS3 \\ VS4 \end{pmatrix} + Cb \begin{pmatrix} BS1 \\ BS2 \\ BS3 \\ BS4 \end{pmatrix} + Cg \begin{pmatrix} GS1 \\ GS2 \\ GS3 \\ GS4 \end{pmatrix} + Cr \begin{pmatrix} RS1 \\ RS2 \\ RS3 \\ RS4 \end{pmatrix} \quad \text{Equation 5}$$

A method of obtaining the intensity ratio Cv:Cb:Cg:Cr of violet, blue, green and red light according to Equation 5 for the first polychromatic light 325 for the color image sensor of the complementary color type is described. A total of integrated emission intensities of the first polychromatic light for the respective colors received by pixels of the plural colors of the color image sensor of the complementary color type is corrected, to become equal to a total of integrated emission intensities of the continuous spectrum light 26 of the xenon lamp for the respective colors received by pixels of the plural colors of the color image sensor of the complementary color type. In the method with Equation 5, an error occurs with the ratio of the integrated emission intensities of the colors in comparison with the method based on Equation 4. However, there is an advantage in reliably determining the values Cv, Cb, Cg and Cr satisfying conditions of Cv>0, Cb>0, Cg>0 and Cr>0. The ratio of the integrated emission intensity of the first polychromatic light 325 between the plural colors received by plural pixels of the color image sensor of the complementary color type is corrected to become substantially equal to the ratio of the integrated emission intensity of the continuous spectrum light 26 of the xenon lamp between the plural colors received by plural pixels of the color image sensor. An error between the ratios is as small as several percents.

In the embodiment, the image sensor 48 has the cyan pixels (Cy), the magenta pixels (Mg), the yellow pixels (Ye) and the green pixels (G), the cyan pixels (first color pixels) being sensitive to cyan (first color), the magenta pixels (third color pixels) being sensitive to magenta (third color), the yellow pixels (fourth color pixels) being sensitive to yellow (fourth color), the green pixels (second color pixels) being sensitive to green (second color). Thus, the violet, blue, green and red light at the intensity ratio Cv:Cb:Cg:Cr is so emitted by use of the light source controller 22 that a ratio between the integrated emission intensity (integrated light quantity) of the cyan from the cyan pixels and the integrated emission intensity of the green from the green pixels is set equal between the use of the first polychromatic light 25 and the use of the continuous spectrum light 26, and that a ratio between the integrated emission intensity of the magenta from the magenta pixels and the integrated emission intensity of the green from the green pixels is set equal between the use of the first polychromatic light 25 and the use of the continuous spectrum light 26, and that a ratio between the integrated emission intensity of the yellow from the yellow pixels and the integrated emission intensity of the green from the green pixels is set equal between the use of the first polychromatic light 25 and the use of the continuous spectrum light 26.

The obtaining method for the intensity ratio with Equation 5 in the third embodiment is applicable for the use of the color image sensor of the primary color type as the image sensor 48. Plural examples of the color image sensor of the primary color type are known, including a sensor having emerald pixels (E) having emerald color filters (E) in addition to the blue, green and red pixels (B, G and R), and another sensor having white pixels (W) or blank pixels without having the color filters. The obtaining method for the intensity ratio with Equation 5 is effective for the color image sensor of the primary color type in addition to the obtaining method for the intensity ratio with Equation 4.

Note that the intensity ratio Cv:Cb:Cg:Cr of the violet, blue, green and red light included in the first polychromatic light can be preferably controlled by considering the form of the object of interest in the same manner as the second embodiment even in the third embodiment in which the color image sensor of the complementary color type is used for the image sensor 48.

One of the pixels receives light of a wavelength range of generation from plural light sources in the first polychromatic light, as indicated with Equation 2 of the first embodiment and Equation 5 of the third embodiment. An integrated emission intensity of the respective wavelength ranges of light received by the one pixel (wavelength ranges of light generated by respective light sources) is corrected to become equal to an integrated emission intensity of reception of the continuous spectrum light 26 of the xenon lamp. Then an intensity ratio Cv:Cb:Cg:Cr of violet, blue, green and red light in the first polychromatic light can be obtained suitably. This method is specially effective for a construction in which a number of the colors of the light sources is higher than a number of the colors of the pixels. See Equation 2 of the first embodiment.

Fourth Embodiment

In the first to third embodiments, the first polychromatic light 25, 225 or 325 is emitted in a form of emulating the use of the continuous spectrum light 26 of the xenon lamp by the LEDs 20a-20d in the light source unit 20. Furthermore, it is possible in the light source controller 22 to change over the first polychromatic light 25, 225 and 325 by use of the LEDs 20a-20d in the light source unit 20, to generate second polychromatic light having a second emission spectrum different from the first polychromatic light 25 and from the continuous spectrum light 26 of the xenon lamp.

Figure 17:
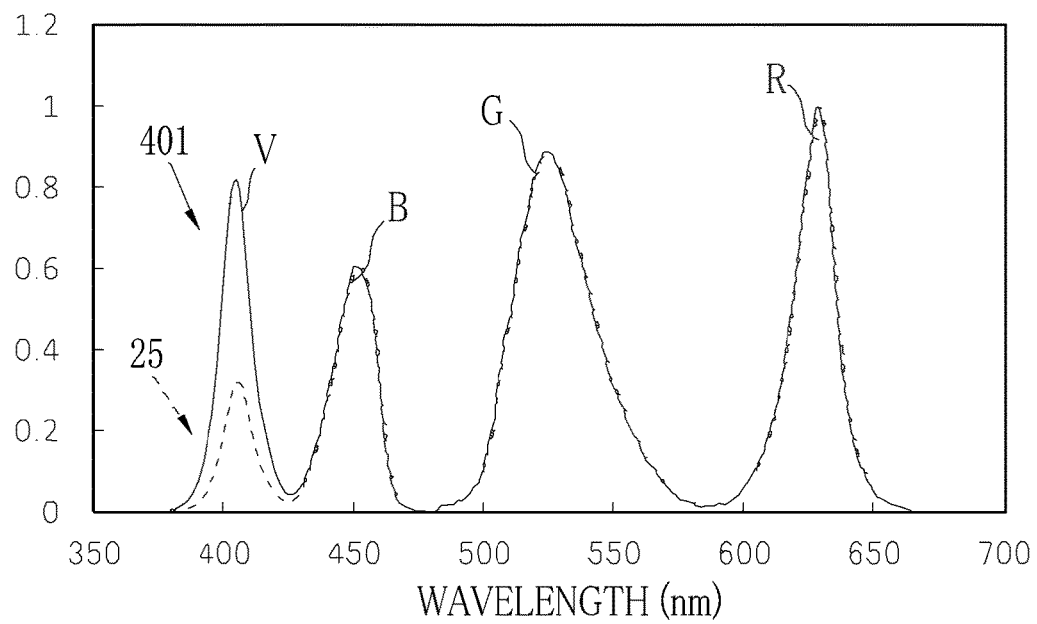
FIG. 17 is a graph illustrating an emission spectrum of second polychromatic light.

The second polychromatic light is light having a particular emission spectrum not having been used in a well-known endoscope system with a xenon lamp. In FIG. 17, the light source controller 22 sets an intensity of at least one of violet and blue light components (for example, violet light) is set larger than that of the first polychromatic light 25. In other words, an integrated emission intensity obtained by receiving second polychromatic light 401 or second multi color spectrum light or second controllable light with blue pixels is set larger than an integrated emission intensity obtained by receiving the first polychromatic light 25 with the blue pixels. In the embodiment, only an intensity of violet light in the second polychromatic light 401 is changed relative to the first polychromatic light 25. Furthermore, it is preferable with the second polychromatic light 401 to set an integrated emission intensity obtained by reception with green pixels smaller than an integrated emission intensity obtained by receiving the first polychromatic light 25 with the green pixels.

Imaging of the object with the second polychromatic light 401 makes it possible to image blood vessels, pit patterns and the like in a surface of the mucosa more clearly than imaging with the continuous spectrum light 26 of the xenon lamp. Changeover between the first polychromatic light 25 and the second polychromatic light 401 is effective with advantages in the use of the polychromatic light described above.

It is possible manually to change over the first polychromatic light 25 and the second polychromatic light 401 by use of a changeover switch (not shown) disposed with the grip handle 12b of the endoscope 12. It is preferable automatically to change over the first polychromatic light 25 and the second polychromatic light 401 according to a type of the endoscope 12 for use in the endoscope system 10.

Figure 18:
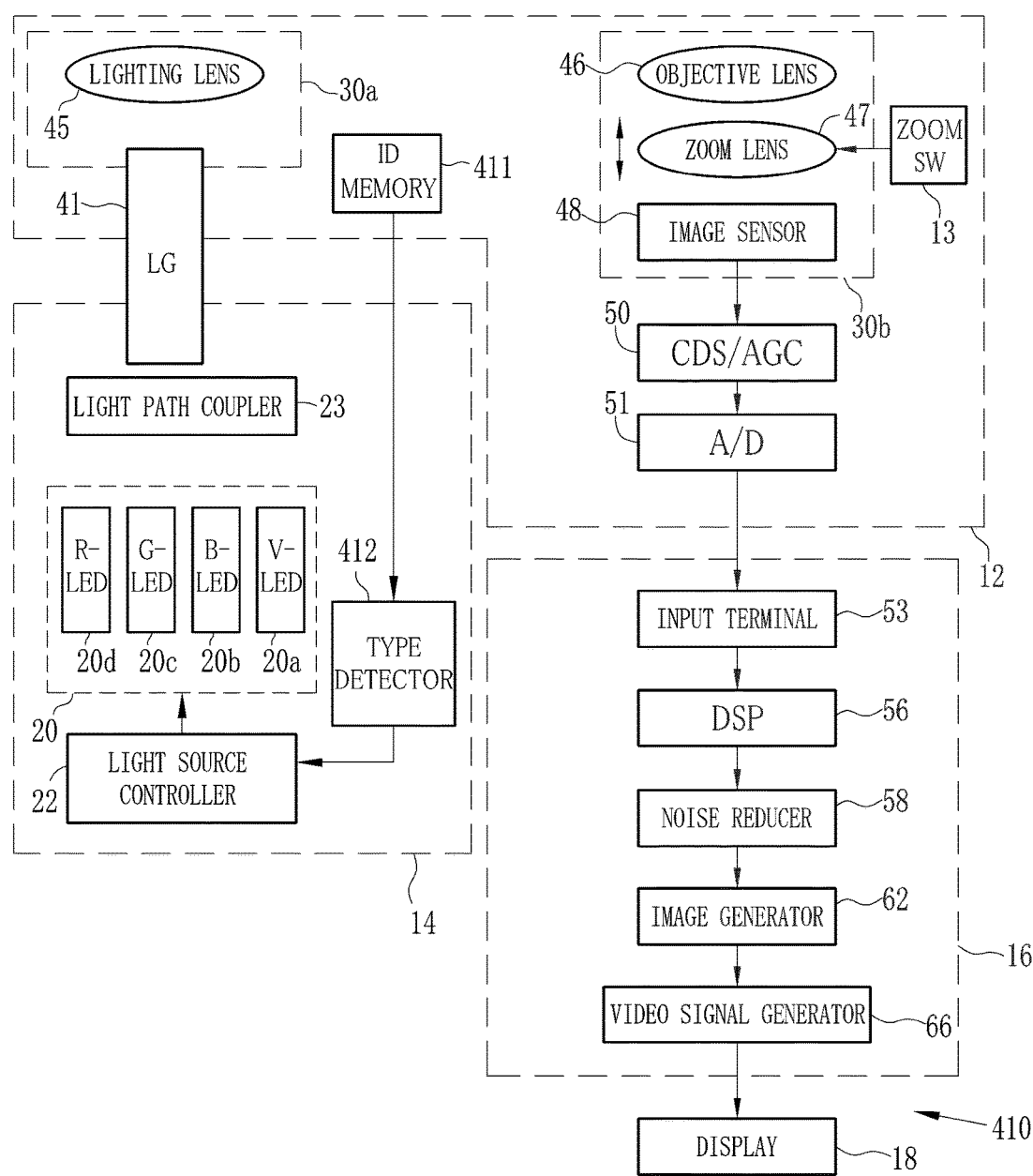
FIG. 18 is a block diagram schematically illustrating a preferred endoscope system in which polychromatic light is changed over according to an endoscope type.

In FIG. 18, an endoscope system 410 automatically changes over the first polychromatic light 25 and the second polychromatic light 401 according to the type of the endoscope 12. The endoscope system 410 includes an ID memory 411 or ID storage medium and a type detector 412.

The ID memory 411 in the endoscope 12 stores information of ID (identification) of the type. The type detector 412 is incorporated in the light source apparatus 14. In case the endoscope 12 becomes connected to the light source apparatus 14, the type detector 412 reads the ID information of the endoscope 12 from the ID memory 411. A type of the endoscope 12 in connection is detected, and input to the light source controller 22. The light source controller 22 changes over illumination of the light source unit 20 between the first polychromatic light 25 and the second polychromatic light 401 according to the detected type of the endoscope 12 from the type detector 412. Assuming that the type of the endoscope 12 is a first type for use in a conventional endoscope system with continuous spectrum light of a xenon lamp, the light source controller 22 automatically selects the first polychromatic light 25 in the light source unit 20. Assuming that the type of the endoscope 12 is a special type different from the first type (for example, type for use only in an endoscope system with polychromatic light), the light source controller 22 automatically selects the second polychromatic light 401 in the light source unit 20.

For connection of the endoscope of the well-known endoscope system including the xenon lamp, a doctor or operator is likely to wish imaging an object of interest in the same manner with the well-known endoscope system, because he or she is accustomed to using the endoscope system. However, for connection of the endoscope of the special endoscope system in which polychromatic light is used, he or she is likely to wish imaging an object of interest in a mode of utilizing the feature of the polychromatic light. Thus, automated changeover between the first polychromatic light 25 and the second polychromatic light 401 according to the type of the endoscope 12 can provide an endoscopic image automatically for particular purposes without complicated manual setting. Furthermore, a combined use of the manual setting and automatic setting is preferred. Initially, light for use at first is set automatically according to the type of the endoscope 12. Then the light can be changed over manually according to intention of the doctor.

Figure 19:
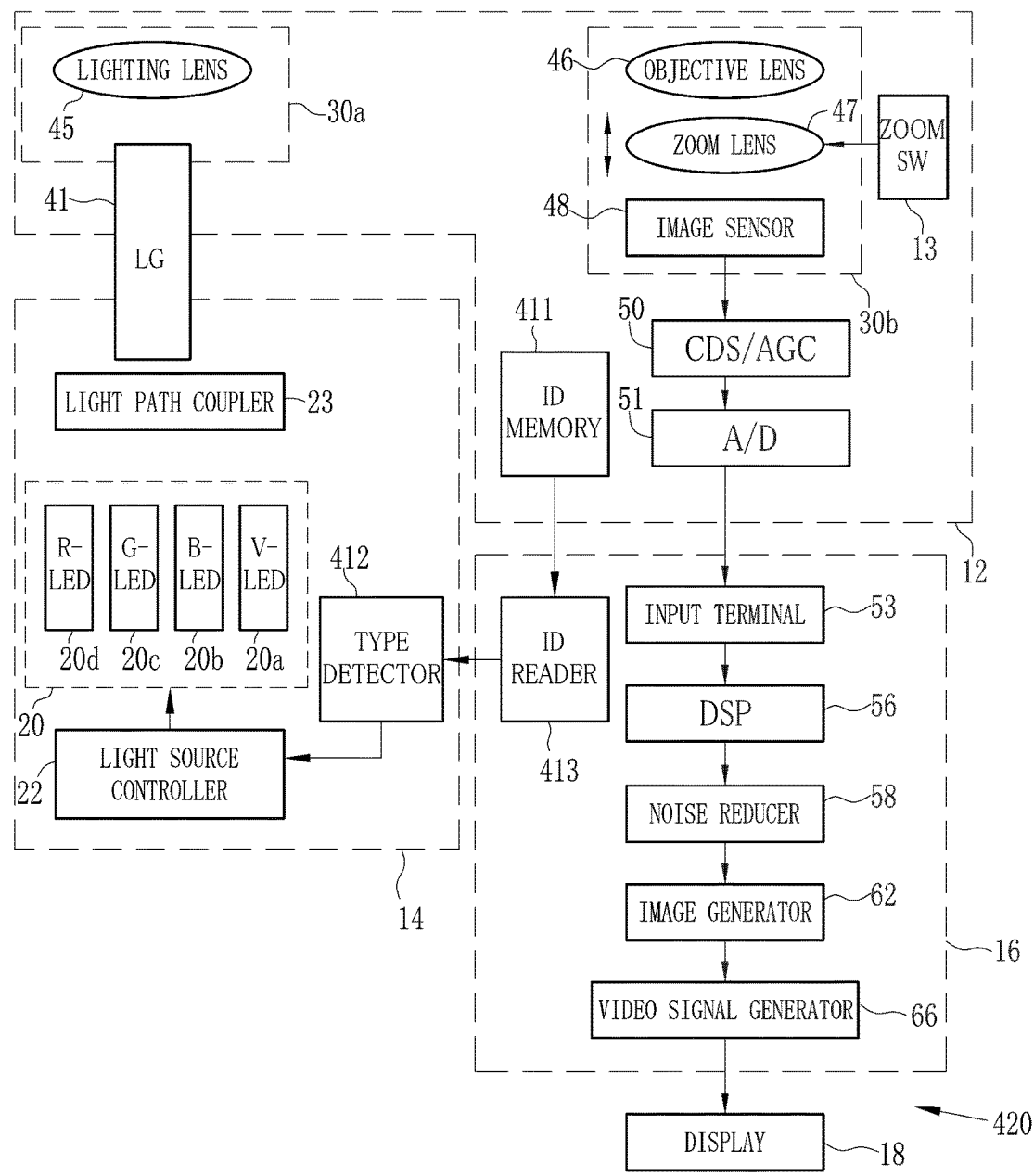
FIG. 19 is a block diagram schematically illustrating a preferred endoscope system which further includes a reader for reading the endoscope type.

In the endoscope system 410, the light source apparatus 14 detects the type of the endoscope 12 by reading the ID information. In contrast, an endoscope system 420 of FIG. 19 has an ID reader 413 incorporated in the processing apparatus 16. The ID reader 413 detects a connected state of the endoscope 12, and also reads ID information from the endoscope 12. The type detector 412 acquires the ID information of the endoscope 12 from the ID reader 413 of the processing apparatus 16, and can detect the type of the endoscope 12.

Fifth Embodiment

Figure 20:
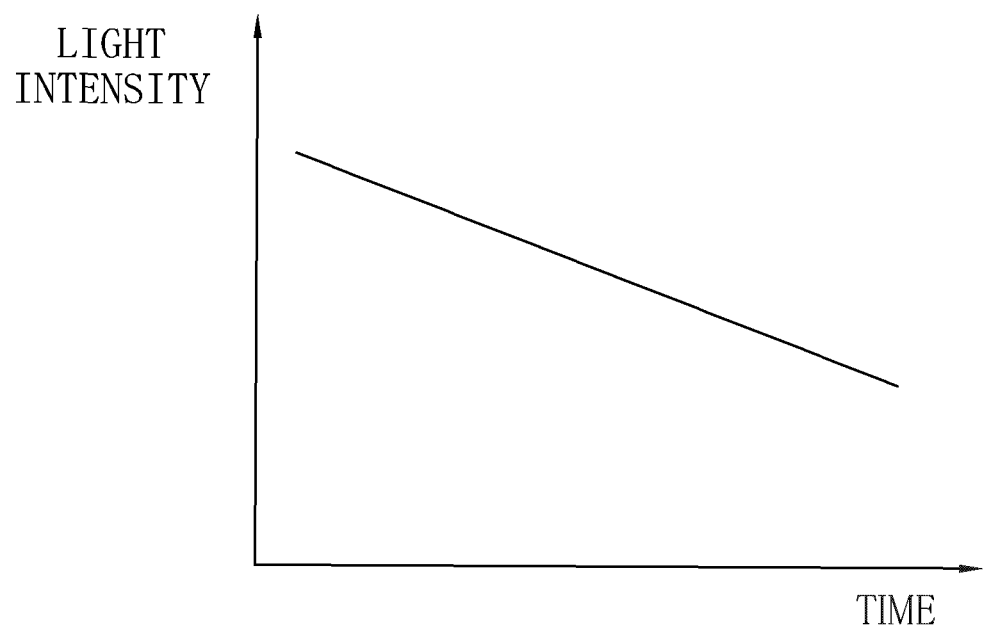
FIG. 20 is a graph illustrating degradation of the LEDs.

Although the useful life of the semiconductor light sources is relatively longer than well-known light sources such as a xenon lamp, the semiconductor light sources are degraded slowly as illustrated in FIG. 20, to lower the intensity even upon driving with a predetermined current or voltage. Also, a degree of the degradation is different according to the type of the semiconductor light sources, such as a wavelength of the light. Should the degradation be neglected, polychromatic light without satisfying the condition of the first polychromatic light 25 may be emitted even after a predetermined control of the light source controller 22 to emit the first polychromatic light 25. Thus, it is preferable in the light source controller 22 to emit the first polychromatic light 25 or the second polychromatic light 401 after considering the degradation of the LEDs 20a-20d in the light source unit 20.

Figure 21:
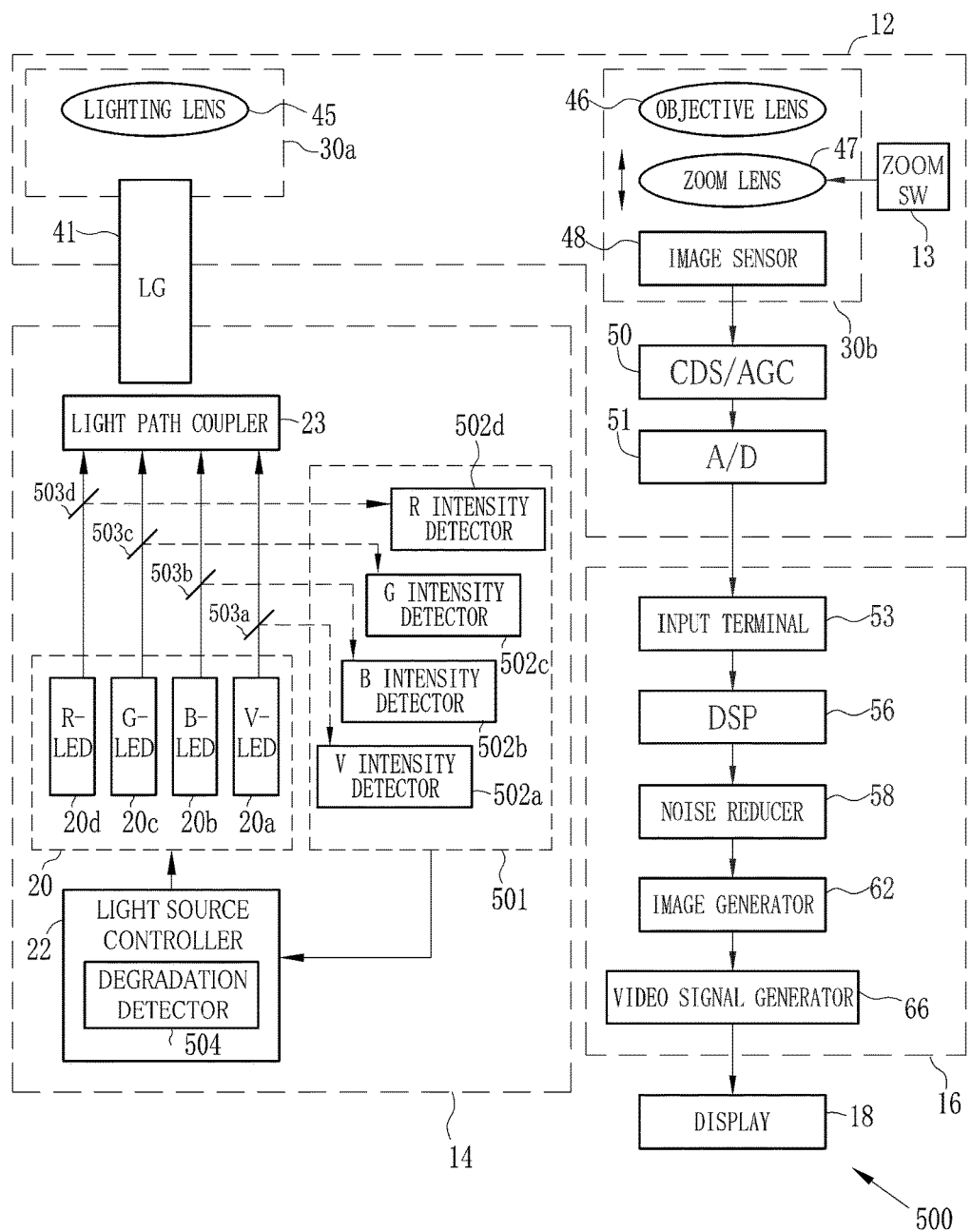
FIG. 21 is a block diagram schematically illustrating a preferred endoscope system for generating polychromatic light according to the degradation.

In FIG. 21, an endoscope system 500 is constructed to emit the first polychromatic light 25 or the second polychromatic light 401 satisfying the condition of the first embodiment and the like even after occurrence of degradation of the LEDs 20a-20d with time in the light source unit 20. The endoscope system 500 includes an intensity detection unit 501 in the light source apparatus 14, and a degradation detector 504 in the light source controller 22.

The intensity detection unit 501 includes a violet intensity detector 502a (V), a blue intensity detector 502b (B), a green intensity detector 502c (G), and a red intensity detector 502d (R). The violet intensity detector 502a receives part of violet light by use of a mirror 503a so as to detect a light intensity (light energy) of the violet light generated by the violet LED 20a. The mirror 503a is disposed downstream of the violet LED 20a, reflects part of the violet light generated by the violet LED 20a for entry to the violet intensity detector 502a, and transmits remaining violet light in a direction toward the light path coupler 23. Similarly, mirrors 503b, 503c and 503d are disposed respectively downstream of the blue LED 20b, the green LED 20c and the red LED 20d, and operate for partial entry of light to the intensity detectors 502b, 502c and 502d and for transmission toward the light path coupler 23. The blue intensity detector 502b receives part of blue light by use of the mirror 503b so as to detect a light intensity of the blue light generated by the blue LED 20b. The green intensity detector 502c receives part of green light by use of the mirror 503c so as to detect a light intensity of the green light generated by the green LED 20c. The red intensity detector 502d receives part of red light by use of the mirror 503d so as to detect a light intensity of the red light generated by the red LED 20d.

Figure 22:
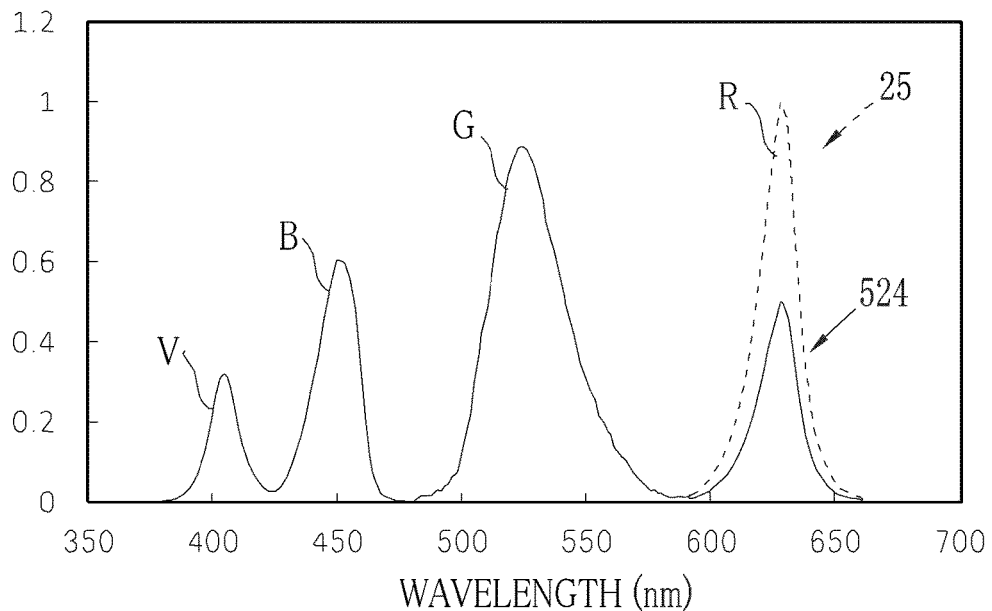
FIG. 22 is a graph illustrating the polychromatic light.

The intensity detection unit 501 inputs information of intensities of violet, blue, green and red light to the light source controller 22 after detection in the intensity detectors 502a-502d for the respective colors. The degradation detector 504 in the light source controller 22 detects degradation of the LEDs 20a-20d with time by use of a driving condition for the LEDs 20a-20d for the first polychromatic light 25, such as a drive current, and detected intensities of the respective colors detected actually the intensity detection unit 501. To this end, the degradation detector 504 detects a lowest level light source among the LEDs 20a-20d having a lowest light intensity with reference to a target light intensity (original value). The light source controller 22 determines light intensity of remaining light sources according to the light intensity of the lowest level light source detected by the degradation detector 504. Let polychromatic light 524 or multi color spectrum light or controllable light be generated by control of the light source controller 22 in FIG. 22. Even though intensities of the LEDs 20a-20d is designated by driving the LEDs 20a-20d in a condition to generate the first polychromatic light 25, an intensity of red light is short of the (original) target light intensity to emit the first polychromatic light 25 for the reason of degradation of the red LED 20d with time. Intensities of violet, blue and green light are still as high as the target light intensity to emit the first polychromatic light 25. Then the degradation detector 504 in the light source controller 22 detects the red LED 20d as a lowest level light source.

Figure 23:
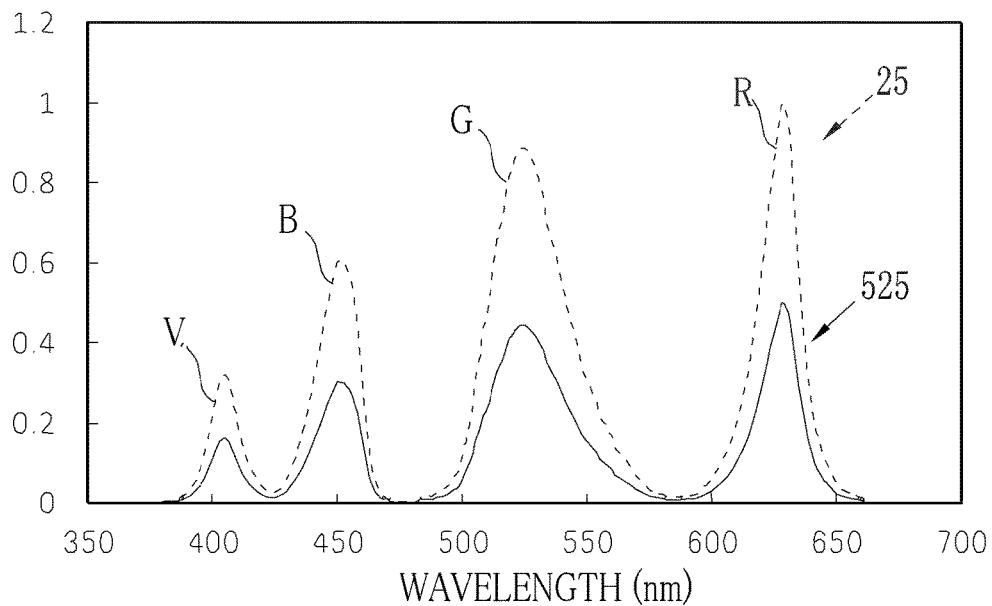
FIG. 23 is a graph illustrating the polychromatic light of adjustment of an intensity according to a lowest level light source.

In FIG. 23, the light source controller 22 performs generation of first polychromatic light 525 or first multi color spectrum light or first controllable light by reducing intensities of violet, blue and green light according to the intensity of red light from the red LED 20d, the first polychromatic light 525 being balanced between the intensities of the red light from the red LED 20d with degradation and violet, blue and green light. Assuming that shortage in the light intensity (light energy) is detected with at least one of the LEDs 20a-20d, the light source controller 22 determines light intensities of the remaining light sources according to the light intensity of the lowest level light source with the greatest shortage in the light intensity with reference to the target light intensity of the LEDs 20a-20d in light included in the first polychromatic light 25. Thus, the first polychromatic light 525 can be generated with balanced intensities of light.

As described above, an intensity of one of the LEDs 20a-20d with the most remarkable degradation is considered to set intensities of the remainder of the LEDs 20a-20d. Thus, the light source controller 22 can perform reliable generation of the first polychromatic light 25 or the second polychromatic light 401 with well-balanced colors of light from the light source unit 20. Also, components of the first polychromatic light 25 and 325 and the second polychromatic light 401 can be generated reliably in a well-balanced form of colors of light. It is unnecessary to redetermine processing parameters or image processing parameters for endoscopic imaging, such as a matrix for matrix processing. No plural sets of such parameters are required. Assuming that mixture of color occurs between color filters of the image sensor 48, correction of the mixture is seriously difficult even by redetermining processing parameters or image processing parameters for use in the endoscopic imaging. However, the imaging of an object of interest can be stably performed owing to the above-described method.

Preferably, detection of the intensities of the light of the respective colors in the intensity detection unit 501 in the embodiment can be performed at least at the time of the calibration. It is preferable in the intensity detection unit 501 to detect the intensities of the colors repeatedly during the emission of the LEDs 20a-20d for imaging, to perform feedback of the intensities to the light source controller 22, to adjust the balance of the first polychromatic light 25 and the like in a real-time manner.

Sixth Embodiment

Figure 24:
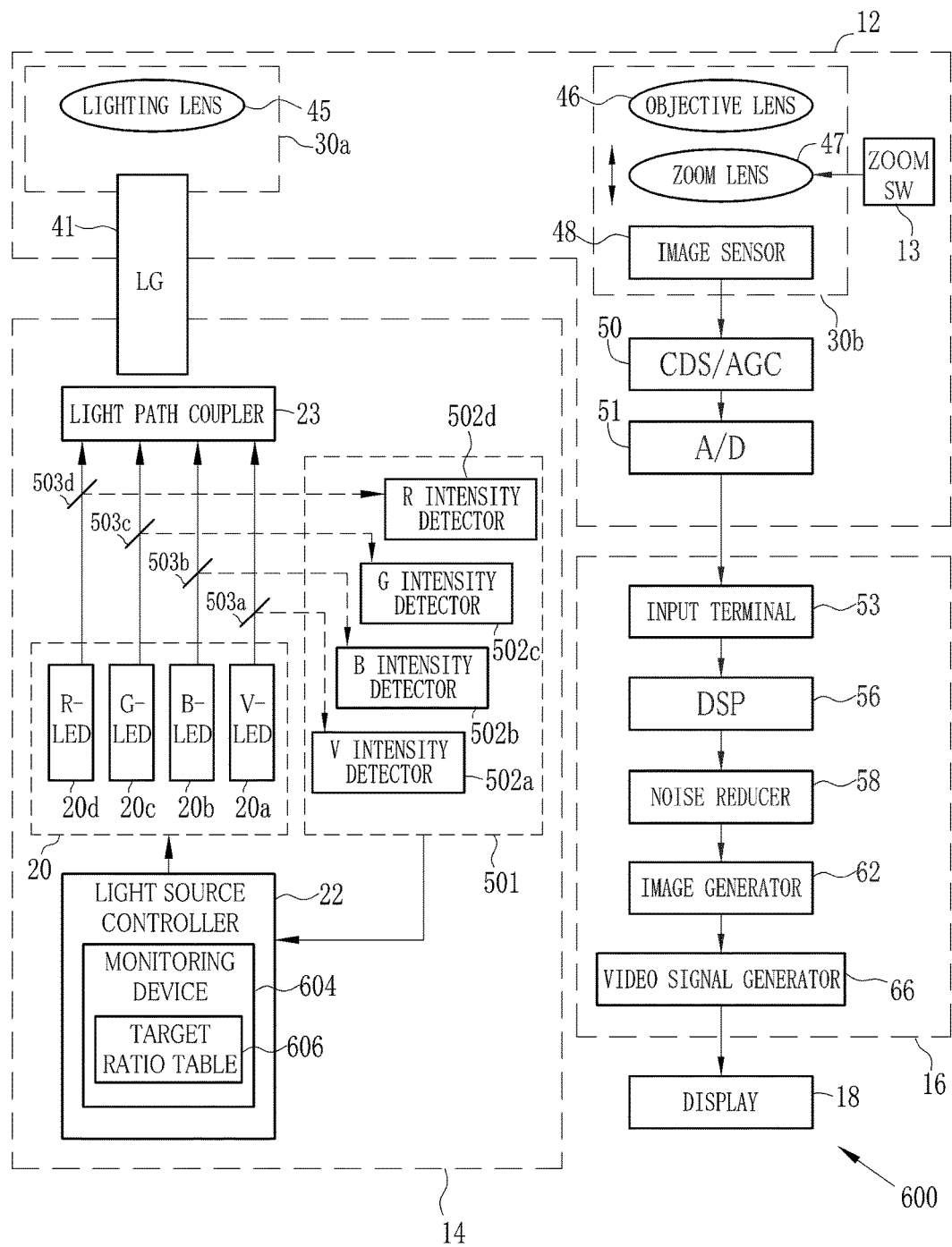
FIG. 24 is a block diagram schematically illustrating a preferred endoscope system having a monitoring device.

In the endoscope system 500 of the above, degradation of the LEDs 20a-20d is detected. However, failure in generating the first polychromatic light 25 correctly may occur in the light source controller 22 due to a reason other than the degradation with time. In FIG. 24, an endoscope system 600 includes the intensity detection unit 501 in the same manner with the endoscope system 500, but has a monitoring device 604 instead of the degradation detector 504 in the light source controller 22.

A target ratio table 606 is stored in a storage medium associated with the monitoring device 604, and has information of a ratio of integrated emission intensities of the continuous spectrum light 26 of the xenon lamp between the plural colors as a reference with pixels of the colors in the image sensor 48. The monitoring device 604 uses the target ratio table 606 and a result of detection in the intensity detection unit 501, and checks whether a ratio of the integrated emission intensity between the plural colors of the first polychromatic light 25 generated actually with the pixels of the plural colors is corrected to become equal to a ratio of the integrated emission intensity between the plural colors of the continuous spectrum light 26 of the xenon lamp with the pixels of the plural colors.

The monitoring device 604 obtains the integrated emission intensities of the pixels of the colors from light intensities (light energy) of the LEDs 20a-20d detected by the intensity detection unit 501 and the spectral characteristic of the color filters in the image sensor 48, and determines a ratio between the integrated emission intensities. For example, the image sensor 48 is the primary color type having blue, green and red pixels. A ratio value Bp/Gp of an integrated emission intensity obtained at the blue pixels to an integrated emission intensity obtained at the green pixels is determined. Also, a ratio value Rp/Gp of an integrated emission intensity obtained at the red pixels to an integrated emission intensity obtained at the green pixels is determined.

The integrated emission intensities of the pixels of the colors are known information previously calculated from the continuous spectrum light 26 of the xenon lamp of the emulation and the spectral characteristics of the color filters in the image sensor 48. Stored information in the target ratio table 606 includes a first ratio value Bx/Gx and a second ratio value Rx/Gx. The first ratio value is a ratio of the integrated emission intensity obtained at the blue pixels to the integrated emission intensity obtained at the green pixels in the use of the continuous spectrum light 26 of the emulation. The second ratio value is a ratio of the integrated emission intensity obtained at the red pixels to the integrated emission intensity obtained at the green pixels in the use of the continuous spectrum light 26 of the emulation.

Then the monitoring device 604 compares the obtained ratio value Bp/Gp with the ratio value Bx/Gx read from the target ratio table 606, and the obtained ratio value Rp/Gp with the ratio value Rx/Gx read from the target ratio table 606. Assuming that an error of the ratio value Bp/Gp with reference to the ratio value Bx/Gx is within a tolerable range (for example, under 10% of the ratio value Bp/Gp), and assuming that an error of the ratio value Rp/Gp with reference to the ratio value Rx/Gx is within a tolerable range (for example, under 10% of the ratio value Rp/Gp), then it is judged that the first polychromatic light 25 is generated appropriately. The light source controller 22 continues generation of the first polychromatic light 25.

Assuming that an error of the ratio value Bp/Gp relative to the ratio value Bx/Gx is not within the tolerable range, or assuming that an error of the ratio value Rp/Gp relative to the ratio value Rx/Gx is not within the tolerable range, the monitoring device 604 judges that no generation of the appropriate first polychromatic light 25 has occurred. Then the light source controller 22 controls the LEDs 20a-20d in feedback control by use of the result of check in the monitoring device 604. Specifically, the light source controller 22 adjusts and controls the light intensities (light energy) of the LEDs 20a-20d according to the error of the ratio value Bp/Gp relative to the ratio value Bx/Gx or the error of the ratio value Rp/Gp relative to the ratio value Rx/Gx as outputs of the monitoring device 604. Thus, light for illumination can be corrected as the first polychromatic light 25 always appropriately.

In the endoscope system 600 of the sixth embodiment, the type of the object of interest is not considered while the monitoring device 604 obtains an integrated emission intensity. However, it is possible to consider a type of the object of interest for the purpose of obtaining integrated emission intensities of the respective colors in the monitoring device 604 and a ratio between the integrated emission intensities. Also, the monitoring device 604 of the endoscope system 600 can operate as the degradation detector 504 of the fifth embodiment. The monitoring device 604, although incorporated in the light source apparatus 14 in the sixth embodiment, can be incorporated in the processing apparatus 16.

Figure 25:
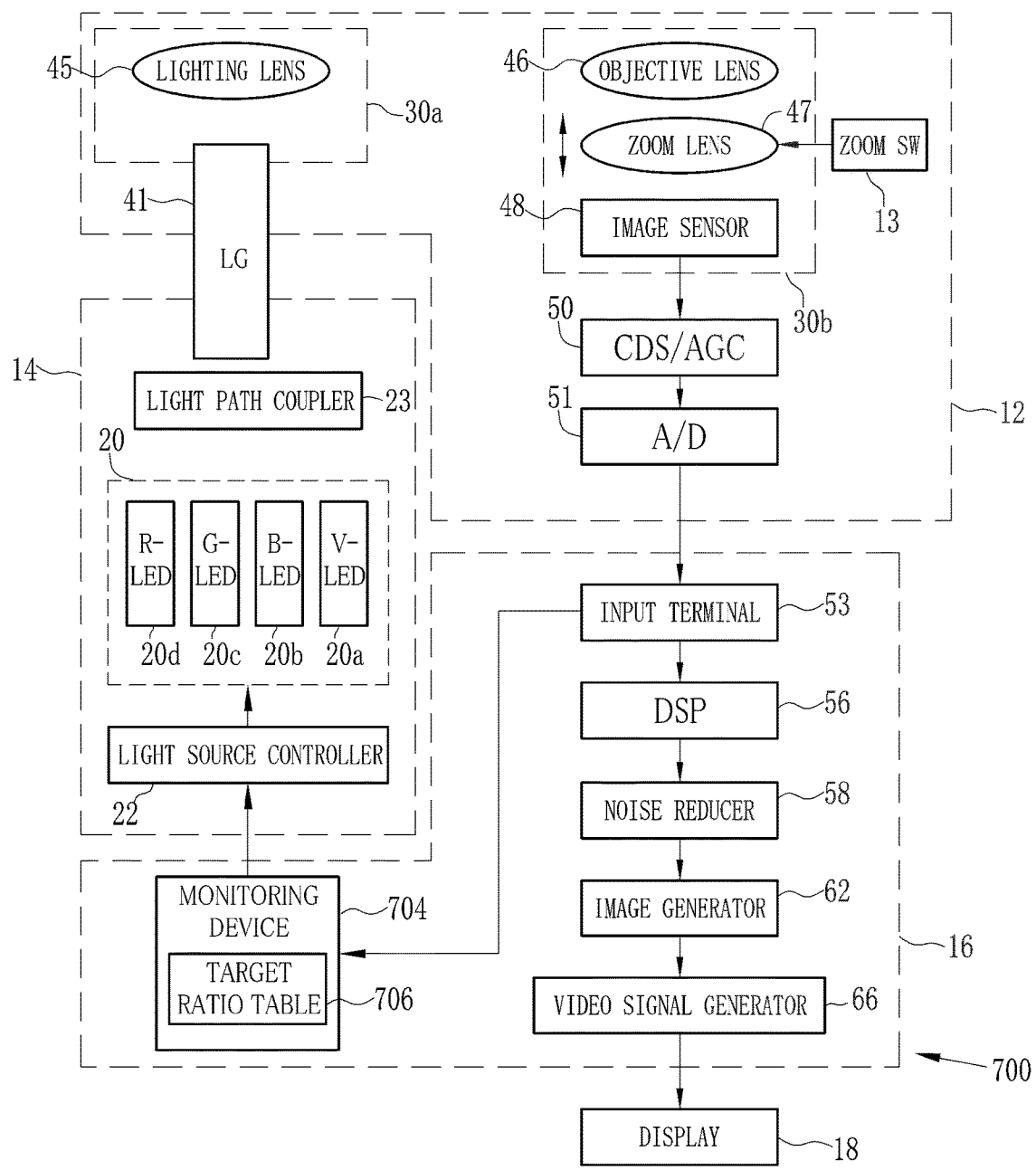
FIG. 25 is a block diagram schematically illustrating a construction in which a monitoring device is incorporated in a processing apparatus.

In the endoscope system 600, the output of the intensity detection unit 501 is used for checking whether the first polychromatic light 25 is set for illumination. However, it is possible to check whether the first polychromatic light 25 is set for illumination by use of the output of the image sensor 48. In FIG. 25, an endoscope system 700 is illustrated. A monitoring device 704 is incorporated in the processing apparatus 16.

For the monitoring device 704, the monitoring device 604 of the sixth embodiment is repeated but with a difference of using the output from the image sensor 48 instead of using the detection result of the intensity detection unit 501. A target ratio table 706 is stored in the monitoring device 704, and contains information of a ratio of the integrated emission intensity of the continuous spectrum light 26 of the xenon lamp as a target of emulation by reception at pixels of the respective colors in the image sensor 48. It is checked by use of the target ratio table 706 and the output of the image sensor 48 whether the ratio of the integrated emission intensity between the plural colors of the first polychromatic light 25 upon reception of the pixels of the respective colors is corrected to become equal to the ratio of the integrated emission intensity between the plural colors of the continuous spectrum light 26 of the xenon lamp upon reception of the pixels of the respective colors.

The monitoring device 704 acquires the image signals of the image sensor 48 from the input terminal 53 (receiver) and obtains a ratio between the image signals. In case the image sensor 48 is the color image sensor of the primary colors with blue, green and red pixels, integrated emission intensities of the pixels of the respective colors are determined by obtaining averages or the like of the blue, green and red image signals (such as mean, median and mode values and other representative values). Thus, the ratio values Bp/Gp and Rp/Gp are obtained. Note that the average or the like of the image signals of the respective colors from the monitoring device 704 are not the integrated emission intensities themselves according to the embodiment, because of being influenced by a gain used upon reading out the signal charge from the image sensor 48, or by processing downstream of the input terminal 53. However, the average or the like of the image signals of the respective colors substantially express the integrated emission intensities, because of the same processing in a distribution emulation mode (xenon emulation mode) of emission of the first polychromatic light 25.

Stored information in the target ratio table 706 includes the first ratio value Bx/Gx and the second ratio value Rx/Gx obtained by consideration of an average or the like of each of the blue, green and red image signals in the use of the continuous spectrum light 26 as a target of emulation. The monitoring device 704 compares the ratio value Bp/Gp being obtained with the first ratio value Bx/Gx read from the target ratio table 706, and compares the ratio value Rp/Gp being obtained with the second ratio value Rx/Gx read from the target ratio table 706. In the same manner as the endoscope system 600 of the sixth embodiment, the light source controller 22 controls the LEDs 20a-20d according to results of the comparison in the monitoring device 704.

The checking can be performed by use of the monitoring device 704 while an object of interest is imaged. It is preferable to image a reference object for checking for the purpose of eliminating influence of specificity of the object of interest or the like, the reference object being a phantom object having reflectance equal to that of the mucosa in a living body, or a white plate from which reflected light is directly incident on the image sensor 48.

In the endoscope system 700, the type of the object of interest is not considered for obtaining the integrated emission intensity of the respective colors in the monitoring device 704. However, it is possible to obtain the integrated emission intensity or a ratio of the integrated emission intensity between the plural colors in the monitoring device 704 by considering the type of the object of interest in the same manner as the second embodiment. To this end, a reference object having reflectance of an esophagus, stomach, large intestine or the like is used for considering the type of the object in the monitoring device 704.

In the endoscope system 700 of the variant, the monitoring device 704 acquires the image signal from the input terminal 53 as an output of the image sensor 48. However, the image signal can be acquired from the digital signal processor 56, the noise reducer 58 or the image generator 62 in place of acquisition from the input terminal 53. Also, the monitoring device 704 can acquire the image signal from the A/D converter 51, the CDS/AGC device 50 or the image sensor 48 in the endoscope 12 in place of acquisition from the circuit devices in the processing apparatus 16.

Figure 26:
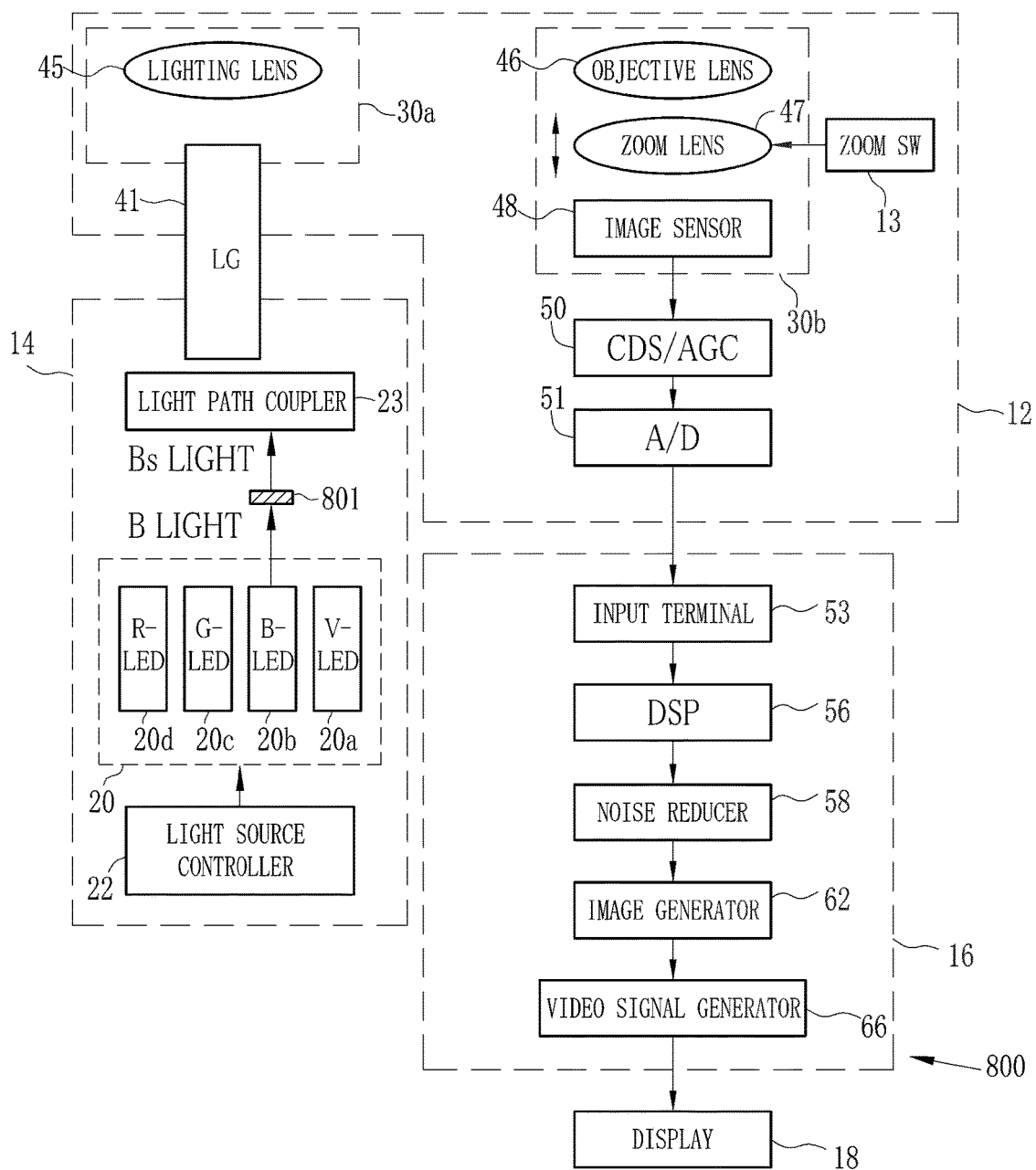
FIG. 26 is a block diagram schematically illustrating a preferred endoscope system having a wavelength selective filter.

In the first to fifth embodiments, the blue light from the blue LED 20b is used for the first polychromatic light 25, 225, 325 and 525. However, light of a wavelength of approximately 450-500 nm lowers a contrast of a structure, such as a surface blood vessel, pit pattern and the like. In FIG. 26, another preferred endoscope system 800 is illustrated. A wavelength selective filter 801 or band stop filter for band limiting is disposed in a light path of the blue LED 20b for reducing an amount of the light with the wavelength of 450-500 nm. Let Bs light be a light component obtained by decreasing the amount of the light component of 450-500 nm from the blue light generated by the blue LED 20b. The Bs light is preferably used in the first polychromatic light 25, 225, 325 and 525. The intensity ratio is obtained by the emission spectrum of the Bs light after passage through the wavelength selective filter 801.

Figure 27:
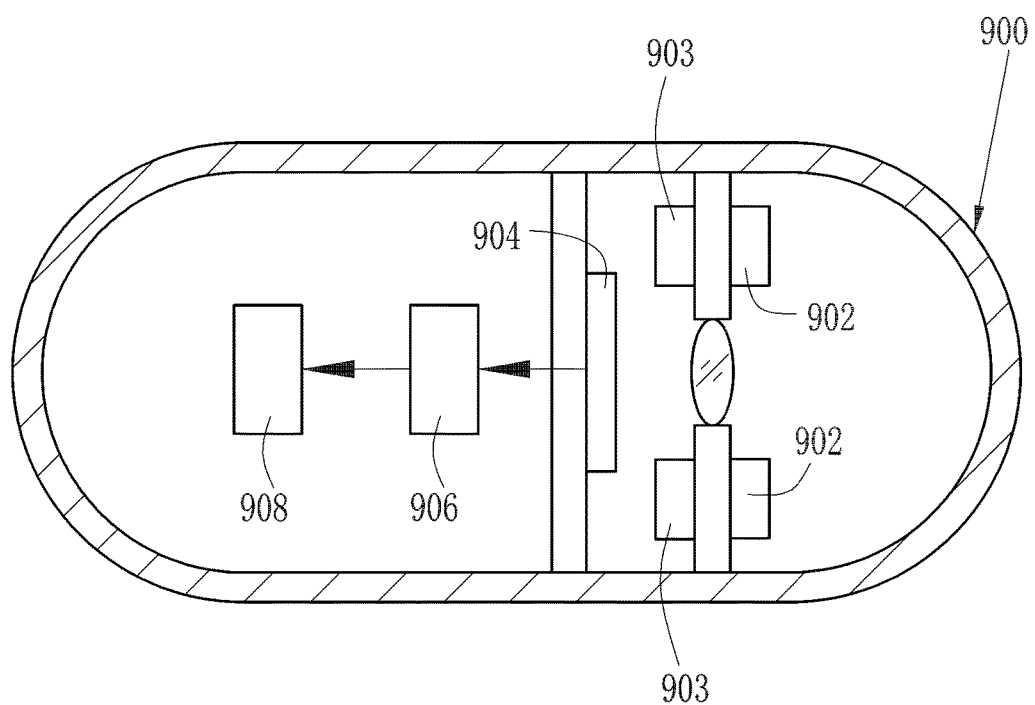
FIG. 27 is a cross section illustrating a capsule endoscope.

In the first to sixth embodiments, the endoscope 12 is a normal type which is entered to the body cavity in its axial direction. In contrast, a capsule endoscope 900 of FIG. 27 can be used in the present invention. A capsule endoscope system includes the capsule endoscope 900 swallowable in a patient body, and a processing apparatus (not shown).

The capsule endoscope 900 includes a light source unit 902, a light source controller 903, an image sensor 904, an image generator 906, and a communication antenna 908. The light source unit 902 includes a violet LED (V) for emitting violet light, a blue LED (B) for emitting blue light, a green LED (G) for emitting green light, and a red LED (R) for emitting red light, in the same structure as the light source unit 20 of the first to sixth embodiments.

The light source controller 903 controls the light source unit 902 in the same manner as the light source controller 22 in the above embodiments. The light source controller 903 has the antenna 908 for radio communication with the processing apparatus in the capsule endoscope system. The processing apparatus is substantially the same as the processing apparatus 16 in the first to sixth embodiments. The image generator 906 is incorporated in the capsule endoscope 900. The generated endoscopic image is transmitted to the processing apparatus by use of the antenna 908. The image sensor 904 is structurally the same as the image sensor 48 in the first to sixth embodiments.

The light source controller 22 in the first to sixth embodiments generates the first polychromatic light 25, 225, 325 and 525 to emulate white light of the xenon lamp. However, first polychromatic light for emulating continuous spectrum light of a broad band other than white light of the xenon lamp can be generated. For example, a halogen lamp other than the xenon lamp may be used in a known endoscope system. Furthermore, a type of a lamp to be emulated can be settable by a manual input of a doctor or operator according to preference in relation to the first polychromatic light.

Also, it is possible to emulate continuous spectrum light generated by a broadband light source unit (as a target of emulation for improved whiteness). A first example of the broadband light source unit includes an excitation source for emitting excitation light, and phosphor combined with the excitation source for emitting fluorescence upon receiving the excitation light. A second example of the broadband light source unit is constituted by a semiconductor light source. In the broadband light source unit of the first example, the excitation source generates ultraviolet radiation, violet light, blue light or the like. The phosphor receives such excitation light, and generates the fluorescence of a wavelength range from green to yellow (or red). In the broadband light source unit of the second example, the semiconductor light source is incorporated for generating white light. It is possible to generate first polychromatic light in the same manner as emulating white light of the xenon lamp of the above embodiments also by emulating continuous spectral light of a broad band in place of the xenon lamp, for example, pseudo white light which is apparently seen as white light to human eyes, and light of bright color other than white color.

In the first to sixth embodiments, the violet LED 20*a*, the blue LED 20*b*, the green LED 20*c* and the red LED 20*d* are used. Furthermore, it is possible to change colors, wavelengths, combination of colors, number and the like of the LEDs as plural light sources for the light source apparatus 14. Other semiconductor light sources can be used in place of the LEDs, such as laser diodes (LDs). Also, light sources in combination of phosphor with the LEDs or LDs can be used.

In the above embodiments, the LEDs 20*a*-20*d* in the light source unit 20 are simultaneously turned on. However, the LEDs 20*a*-20*d* can be successively turned on one color after another while the image sensor 48 images the object of interest (during the period of the photoelectric conversion). The intensity can be controlled by adjusting the period of turn-on for each of the colors while the image sensor 48 images the object of interest. It is possible to obtain the same results as the first to sixth embodiments in which the LEDs 20*a*-20*d* are simultaneously turned on in the light source unit 20.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An endoscope system comprising:
a light source apparatus having plural light sources for discretely emitting light of colors different from one another, for generating first polychromatic light having a first polychromatic spectrum by combining light from said plural light sources;
an image sensor having pixels of plural colors sensitive to colors different from one another;
a light source controller for controlling said plural light sources, to cause an intensity ratio of an integrated emission intensity between said plural colors according to receiving said first polychromatic light with respectively said pixels of said plural colors to become equal to a ratio of an integrated emission intensity between said plural colors according to receiving continuous spectrum light with respectively said pixels of said plural colors, said continuous spectrum light having an at least partial wavelength range of light emitted by a white light source.

2. An endoscope system as defined in claim 1, wherein said continuous spectrum light is white light.

3. An endoscope system as defined in claim 2, wherein said white light is emitted by a xenon lamp.

4. An endoscope system as defined in claim 1, wherein said image sensor includes first color pixels sensitive to a first color, second color pixels sensitive to a second color, and third color pixels sensitive to a third color;
said light source controller causes a ratio between an integrated emission intensity of said first color obtained with said first color pixels and an integrated emission intensity of said second color obtained with said second color pixels to be equal between use of said first polychromatic light and use of said continuous spectrum light; and
said light source controller causes a ratio between an integrated emission intensity of said third color obtained with said third color pixels and said integrated emission intensity of said second color to be equal between said use of said first polychromatic light and said use of said continuous spectrum light.

5. An endoscope system as defined in claim 4, wherein said image sensor further includes fourth color pixels sensitive to a fourth color;
said light source controller causes said ratio between said integrated emission intensity of said first color obtained with said first color pixels and said integrated emission intensity of said second color obtained with said second color pixels to be equal between said use of said first polychromatic light and said use of said continuous spectrum light;
said light source controller causes said ratio between said integrated emission intensity of said third color obtained with said third color pixels and said integrated emission intensity of said second color to be equal between said use of said first polychromatic light and said use of said continuous spectrum light; and
said light source controller causes a ratio between an integrated emission intensity of said fourth color obtained with said fourth color pixels and said integrated emission intensity of said second color to be equal between said use of said first polychromatic light and said use of said continuous spectrum light.

6. An endoscope system as defined in claim 1, wherein said light source controller controls a light intensity ratio between said plural light sources.

7. An endoscope system as defined in claim 1, wherein said light source controller causes an intensity ratio of an integrated emission intensity between said plural colors according to receiving returned light of said first polychromatic light applied to an object with respectively said pixels of said plural colors to become equal to a ratio of an integrated emission intensity between said plural colors according to receiving returned light of said continuous spectrum light applied to said object with respectively said pixels of said plural colors.

8. An endoscope system as defined in claim 6, further comprising a ratio memory for storing said light intensity ratio for each of types of an object to be imaged;
    wherein said light source controller selects said light intensity ratio to be used in association with one of said types of said object.

9. An endoscope system as defined in claim 1, wherein said image sensor is a color image sensor of a complementary color type having color filters of cyan, magenta and yellow.

10. An endoscope system as defined in claim 9, wherein said light source controller further causes a total of said integrated emission intensity for respective said colors according to receiving said first polychromatic light with said pixels of said plural colors to be equal to a total of said integrated emission intensity for respective said colors according to receiving said continuous spectrum light with said pixels of said plural colors for respective wavelength ranges.

11. An endoscope system as defined in claim 1, wherein said image sensor is a color image sensor of a primary color type having color filters of blue, green and red.

12. An endoscope system as defined in claim 11, wherein assuming that a number of said colors of said light sources is larger than a number of said colors of said pixels, and that one of said pixels receives light of a wavelength range generated by said light sources of said plural colors in said first polychromatic light, then said integrated emission intensity is set equal to an integrated emission intensity obtained by receiving said continuous spectrum light for each of said wavelength range of said light received by said one pixel.

13. An endoscope system as defined in claim 11, wherein said light source apparatus with said plural light sources generates second polychromatic light having a second polychromatic spectrum different spectrally from said first polychromatic light and said continuous spectrum light;
    said light source controller causes an integrated emission intensity according to receiving said second polychromatic light with blue color pixels having a blue color filter to be larger than an integrated emission intensity according to receiving said first polychromatic light with said blue color pixels.

14. An endoscope system as defined in claim 1, further comprising an intensity detection unit for detecting light intensities of respectively said plural light sources;
    wherein said light source controller operates by use of a result output by said intensity detection unit, considers a light intensity of a lowest level light source of which a shortage of said light intensity is greatest with reference to a target light intensity of said light intensity for said first polychromatic light, and sets light intensities of remaining light sources among said light sources.

15. An endoscope system as defined in claim 14, wherein said intensity detection unit detects said light intensities of said plural light sources repeatedly while said plural light sources emit said light.

16. An endoscope system as defined in claim 1, further comprising a monitoring device for checking whether said ratio of said integrated emission intensity between said colors obtained by receiving said first polychromatic light with said pixels of said plural colors is equal to said ratio of said integrated emission intensity between said colors obtained by receiving said continuous spectrum light with said pixels of said plural colors.

17. An endoscope system as defined in claim 16, further comprising an intensity detection unit for detecting light intensities of respectively said plural light sources;
    wherein said monitoring device operates by use of a result output by said intensity detection unit, and checks whether said intensity ratio of said integrated emission intensity between said plural colors according to receiving said first polychromatic light with respectively said pixels of said plural colors is equal to said ratio of said integrated emission intensity between said plural colors according to receiving said continuous spectrum light with respectively said pixels of said plural colors.

18. An endoscope system as defined in claim 16, wherein said monitoring device operates by use of an output of said image sensor, and checks whether said intensity ratio of said integrated emission intensity between said plural colors according to receiving said first polychromatic light with respectively said pixels of said plural colors is equal to said ratio of said integrated emission intensity between said plural colors according to receiving said continuous spectrum light with respectively said pixels of said plural colors.

19. An endoscope system as defined in claim 16, wherein said light source controller controls said plural light sources according to a result of checking in said monitoring device.

20. A method of operating an endoscope system including a light source apparatus having plural light sources for discretely emitting light of colors different from one another, for generating first polychromatic light having a first polychromatic spectrum by combining light from said plural light sources, and an image sensor having pixels of plural colors sensitive to colors different from one another, said method comprising a step of:
    controlling said plural light sources with a light source controller, to cause an intensity ratio of an integrated emission intensity between said plural colors according to receiving said first polychromatic light with respectively said pixels of said plural colors to become equal to a ratio of an integrated emission intensity between said plural colors according to receiving continuous spectrum light with respectively said pixels of said plural colors, said continuous spectrum light having an at least partial wavelength range of light emitted by a white light source.

* * * * *